United States Patent
Bock et al.

(10) Patent No.: US 7,934,679 B2
(45) Date of Patent: May 3, 2011

(54) AIRCRAFT CABIN

(75) Inventors: Thomas Bock, Blagnac (FR); Jean-Jacques Coste, Mondeville (FR)

(73) Assignee: Singapore Airlines Limited, Airline House (SG)

( * ) Notice: Subject to any disclaimer, the term of this patent is extended or adjusted under 35 U.S.C. 154(b) by 0 days.

(21) Appl. No.: 10/590,025

(22) PCT Filed: Feb. 17, 2005

(86) PCT No.: PCT/SG2005/000042
§ 371 (c)(1), (2), (4) Date: Feb. 27, 2007

(87) PCT Pub. No.: WO2005/080196
PCT Pub. Date: Sep. 1, 2005

(65) Prior Publication Data
US 2007/0170310 A1    Jul. 26, 2007

(30) Foreign Application Priority Data
Feb. 20, 2004  (AU) ................................ 2004900872

(51) Int. Cl.
*B64D 11/00* (2006.01)
*B64D 11/06* (2006.01)
(52) U.S. Cl. ........................... 244/118.6; 244/122 R
(58) Field of Classification Search ............... 244/118.6, 244/118.5, 117 R, 122 R; 296/156; 105/315, 105/316, 343, 324, 321
See application file for complete search history.

(56) References Cited

U.S. PATENT DOCUMENTS

| | | | |
|---|---|---|---|
| 245,746 A * | 8/1881 | Rodgers | 105/316 |
| 1,313,531 A * | 8/1919 | Fowler | 105/315 |
| 2,092,655 A | 9/1937 | Page, Jr. | |
| 2,205,085 A * | 6/1940 | Crawford | 105/316 |
| 2,612,120 A * | 9/1952 | Crawford | 105/316 |
| 4,134,233 A * | 1/1979 | Gutridge et al. | 49/411 |
| 4,314,733 A * | 2/1982 | Smith | 312/183 |
| 4,318,195 A * | 3/1982 | Reppas | 5/2.1 |
| 5,024,398 A * | 6/1991 | Riedinger et al. | 244/118.5 |
| 5,639,141 A * | 6/1997 | Hanemaayer | 296/156 |
| 6,056,239 A * | 5/2000 | Cantu et al. | 244/118.6 |
| 6,092,581 A * | 7/2000 | Andersson | 160/268.1 |
| 6,152,400 A * | 11/2000 | Sankrithi et al. | 244/118.5 |
| 6,209,956 B1 * | 4/2001 | Dryburgh et al. | 297/245 |

(Continued)

FOREIGN PATENT DOCUMENTS

EP    1103213 A2    5/2001

(Continued)

OTHER PUBLICATIONS

Supplementary European Search Report corresponding to European Patent Application No. 05711200, dated Mar. 12, 2010.

*Primary Examiner* — Tien Dinh
*Assistant Examiner* — Richard R Green
(74) *Attorney, Agent, or Firm* — Sughrue Mion, PLLC

(57) ABSTRACT

An aircraft cabin that comprises a plurality of compartments (5) for passengers each having side walls (7a, 7b, 15) and accessible via a doorway (9) in one of the side walls (7a, 7b, 15). The compartments (5) include door assemblies for closing the doorways (9) and creating enclosed spaces and chair and other furniture interactively arranged in the compartment (5).

22 Claims, 34 Drawing Sheets

U.S. PATENT DOCUMENTS

| | | | |
|---|---|---|---|
| 6,273,366 B1 * | 8/2001 | Sprenger et al. | 244/118.5 |
| 6,398,164 B1 * | 6/2002 | Fasse | 244/118.6 |
| 6,520,091 B1 * | 2/2003 | Dettmers | 108/42 |
| 7,318,622 B2 * | 1/2008 | Rezag et al. | 297/118 |
| 2001/0022218 A1 * | 9/2001 | Schlecht et al. | 160/370.22 |
| 2002/0084042 A1 * | 7/2002 | Kimmet | 160/84.04 |
| 2003/0025036 A1 * | 2/2003 | Farnsworth | 244/118.1 |
| 2003/0089269 A1 * | 5/2003 | Oakley | 105/397 |
| 2005/0001097 A1 * | 1/2005 | Saint-Jalmes | 244/118.6 |

FOREIGN PATENT DOCUMENTS

| | | |
|---|---|---|
| FR | 2842497 A1 * | 7/2002 |
| GB | 2 362 095 A | 11/2001 |
| GB | 2362095 A * | 11/2001 |
| JP | 9-202232 A | 8/1997 |
| JP | 0902232 A * | 8/1997 |
| WO | 02/28712 A1 | 4/2002 |
| WO | WO 03013942 A1 * | 2/2003 |

\* cited by examiner

AIRCRAFT CABIN

The present invention relates to an aircraft cabin.

In general terms, the invention is an aircraft cabin that comprises a plurality of "private" passenger compartments for passengers during an aircraft flight, with each compartment comprising walls that define a compartment space and being accessible via a doorway in one of the walls, and with each compartment at least comprising a chair for a passenger.

Preferably the cabin comprises a section of a total aircraft cabin.

Preferably the compartment walls are at least 1.5 m high.

More preferably the compartment walls are at least 1.6 m high.

The selection of the height of the compartment walls to be at least 1.5 m ensures privacy for passengers in the compartments.

Preferably the cabin comprises at least 3 rows of the compartments extending in a length-wise extending direction of the aircraft, with adjacent rows being separated by length-wise extending aisles, and with: (a) two outer rows being positioned along opposite sides of the aircraft with the aircraft side walls forming compartment walls, and (b) at least one internal row being positioned between the outer rows and separated from at least one outer row by a said length-wise extending aisle.

With this arrangement, the doorway walls define the aisles, and the compartments are accessible from the aisles via the doorways.

Preferably the doorways divide the doorway walls into two sections, with one section on each side of each doorway.

Preferably the doorways are positioned centrally in the doorway walls.

Preferably the aisles are curved along the length thereof.

Preferably the curved aisles are formed by forming the doorway walls as curved walls, for example by being convex as viewed from the aisles, and by positioning the compartments so that the doorways of the compartments on opposite sides of the aisles are not aligned.

More preferably the compartments are positioned so that the doorways of the compartments on one side of the aisles face the doorway walls on the other side of the aisles, and vice versa.

Forming the doorway walls as curved walls as viewed from the aisles means that there is additional space in these sections of the compartments for housing furniture in the compartments. This is an advantage because it makes it possible to make more efficient use of the available space within the compartments.

Preferably the walls that form the two outer rows of the compartments comprise (a) the aircraft side walls, (b) walls that extend inwardly from the aircraft side walls, and (c) the doorway walls. With this arrangement, the aircraft side walls form length-wise extending outer side walls of the compartments, the walls that extend inwardly from the aircraft side walls form end walls of the compartments, and the doorway walls form length-wise extending inner side walls of the compartments.

Preferably the or each interior row of the compartments comprises a plurality of pairs of length-wise extending compartments, with the doorways of the compartments of each pair providing access to the compartments from aisles on opposite sides of the interior row.

Preferably the compartments of at least one pair of compartments is separated by a length-wise extending wall that is a removable wall, whereby the pair of compartments may be converted into a double compartment by removing the removable wall.

Preferably each compartment of at least one pair of compartments comprises single beds that can be moved from storage positions to sleep positions that are in side-by-side relationship when the compartments are converted into the double compartment so as to form a double bed.

Preferably the cabin comprises a plurality of wardrobes in walls of the compartments that separate adjacent compartments in the rows of compartments.

Preferably the wardrobes include wardrobes that are mounted for sliding movement between storage positions in the walls and operative positions in which the wardrobes extend into the aisles and are accessible from the aisles.

Preferably each compartment includes doors for the doorways so that the compartments can be completely enclosed spaced when the doors are closed.

In general terms, the invention also comprises a private passenger compartment for a passenger during an aircraft flight that comprises walls that define a compartment space, a doorway in one of the walls that enables access to the compartment from an aisle, and a chair and other basic furniture located in the compartment space in an interactive way so that the furniture can be selectively arranged in a number of different configurations.

Preferably the compartment walls are at least 1.5 m high.

More preferably the compartment walls are at least 1.6 m high.

Preferably the doorway divides the doorway wall into two sections, with one section on each side of the doorway.

Preferably the doorway is positioned centrally in the doorway wall.

Preferably the sections of the doorway wall are curved, for example by being convex as viewed from the aisle, so that the compartment is wider in these sections of the compartment than in the region of the doorway.

Preferably the doorway wall includes at least one window.

More preferably the doorway wall includes at least two windows, with at least one window in each section of the doorway wall.

Preferably the windows include retractable blinds that can be closed.

Preferably the compartment include a door assembly for closing the doorway.

The door assembly may comprise a door mounted for sliding movement from a retracted position within the doorway wall to a closed position in which the door extends across the doorway and closes the compartment.

Preferably the door assembly includes a pair of doors mounted for sliding movement inwardly towards each other from retracted positions within the sections of the doorway walls that are on opposite sides of the doorway.

Preferably the doors include transparent windows that are positioned so that the view through the windows in the doorway walls is not obscured by the doors when the doors are in the retracted positions.

Preferably the doors include retractable blinds that can be closed when the doors are in the closed positions.

Alternatively, the door assembly may comprise an upper rail and a curtain supported by the rail.

Preferably the rail is mounted for sliding movement between a retracted position within the doorway wall and an operative, ie closed, position in which the rail extends across the doorway.

Preferably the curtain is adapted to fold in a concertina fashion so that (a) the curtain folds against the doorway wall when the rail is slid into the retracted position and (b) the curtain expands and closes the doorway when the rail is in the operative position.

Preferably the configurations of the compartment comprise relaxation, work, and sleep configurations.

In addition to the chair, the other basic furniture of the compartment may comprise any one or more of a table assembly, a cadenza that houses the table assembly when the table assembly is in a folded position, a seat, and a bed.

With this selection of basic furniture, preferably the bed is foldable from a storage position in one of the compartment walls to a sleep position within the compartment.

Preferably the bed is a bi-fold bed.

Preferably the chair is foldable from an operative position in which a person can sit upright in the chair to an inoperative position in which the folded chair defines a support for the bed when the bed is in the sleep position.

Preferably the chair defines a bedside table when the chair is in the inoperative position.

Preferably the seat is adapted to define a support for the bed when the bed is in the sleep position.

Preferably the cadenza is adapted to define a support for the bed when the bed is in the sleep position.

Preferably the cadenza is movable from a raised operative position in which the cadenza can be accessed conveniently by a passenger seated in the chair to a lowered bed support position.

Preferably the table assembly is housed in the cadenza so that it can be moved, for example by being swiveled, from a stored position within the cadenza to an operative position with a table of the table assembly extending horizontally into the compartment proximate the chair.

There are a large number of possible interactive combinations of the above-described basic furniture within the compartment.

One interactive combination of the above-described furniture in the compartment space comprises: (a) the chair to one side of the doorway, (b) the seat to the other side of the doorway, (c) the cadenza against the wall opposite the doorway, and (d) the table assembly housed in the cadenza and movable between the stored position within the cadenza and the operative position with the table of the table assembly extending horizontally into the space between the chair and the seat.

In addition to the chair, the other basic furniture of the compartment may also comprise any one or more of a work desk, a table assembly, a seat, a bed and a visual display system of an entertainment system.

With this selection of basic furniture, in one embodiment the compartment comprises the following interactive combination of the above-described basic furniture in the compartment space: (a) the chair in one corner of the compartment space, (b) the work desk along at least a part of one wall of the compartment and proximate the chair, (c) the table assembly movable between a stored position adjacent one wall of the compartment and an operative position with a table of the table assembly extending horizontally proximate the chair.

Preferably the compartment comprises the bed movable between a raised storage position and a lowered sleep position on the work desk.

Preferably the compartment comprises the seat adjacent at least a part of one wall of the compartment.

Preferably the work desk and the seat are positioned adjacent different walls of the compartment.

In another embodiment the compartment comprises the following interactive combination of the above-described basic furniture in the compartment space: (a) the chair in one corner of the compartment space, (b) the seat adjacent one wall of the compartment, (c) the table assembly movable between a stored position adjacent one wall of the compartment and an operative position with a table of the table assembly extending horizontally proximate the chair.

In another embodiment the compartment comprises the following interactive combination of the above-described basic furniture in the compartment space: (a) the chair in one corner of the compartment space, (b) the bed movable between a raised storage position and a lowered sleep position, (c) the table assembly movable between a stored position adjacent one wall of the compartment and an operative position with a table of the table assembly extending horizontally proximate the chair.

In another, although not the only other, embodiment the compartment comprises the following interactive combination of the above-described basic furniture in the compartment space: (a) the chair in one corner of the compartment space, (b) the seat adjacent a wall opposite the chair when the chair is in a take-off position, (c) the work desk adjacent a wall that is in a lengthwise-extending direction of the aircraft, (d) the table assembly movable between a stored position adjacent the same wall as the work desk and an operative position with a table of the table assembly extending horizontally in a space between the chair and the seat, and (e) the bed movable between a raised storage position and a lowered sleep position on the work desk.

The term "take-off" position is understood herein to mean a position in which a person seated in the chair is facing forward in the direction of travel of the aircraft.

Preferably the work desk and the table assembly are located adjacent the wall that is opposite the wall that defines the doorway.

Preferably the work desk defines a support platform for the bed and supports the bed when the bed is in the sleep position.

Preferably the bed is stored in a raised position in the compartment space and is moveable down to a lowered operative position on the platform and is supported by the platform in the lowered position.

Preferably the work desk and the table assembly are positioned in relation to the chair when the table assembly is in the operative position so that the chair can be swiveled between positions facing the work desk and the table assembly.

Preferably a work platform of the work desk is vertically adjustable to accommodate different requirements of different passengers. This feature makes it possible to design the passenger seat to be with a fixed vertical position.

Preferably the stored position of the table assembly is adjacent the work desk.

In an alternative, although not the only possible alternative embodiment, the stored position of the table assembly is within the space occupied by the work desk.

Preferably the table assembly comprises: (a) a base member that can slide between the stored position adjacent the side wall and the operative position between the chair and the seat, (b) a support arm pivotally mounted to the base member and foldable between the storage position and the operative position, and (c) a table pivotally mounted to the support arm.

The above-described table assembly can be moved from the stored position to the operative position by sliding or otherwise moving the base member outwardly from the storage position, lifting the table upwardly and inwardly into the compartment space and thereby pivoting the support arm upwardly and inwardly into the compartment space until the table is in the horizontal operative position.

Preferably the support arm comprises a table support element that is positioned to support an underside of the table when the table assembly is the operative position with the table in the horizontal position.

Preferably the table comprises side wings that can be folded between an inward storage position and an outward operative position.

Preferably the base member defines a storage compartment. By way of example, the storage compartment may be used for storing a brief case, etc.

In general terms, the present invention also comprises the above-described table assembly.

In general terms, the present invention also comprises the above-described sliding door assembly.

In general terms the present invention also comprises an aircraft that comprises the above-described cabin.

The present invention is described further by way of example with reference to the accompanying drawings of which:

FIGS. 1 to 19 and 20 to 39 illustrate two embodiments of an aircraft cabin 3 that forms part of a total cabin layout of the aircraft.

Figure 1:
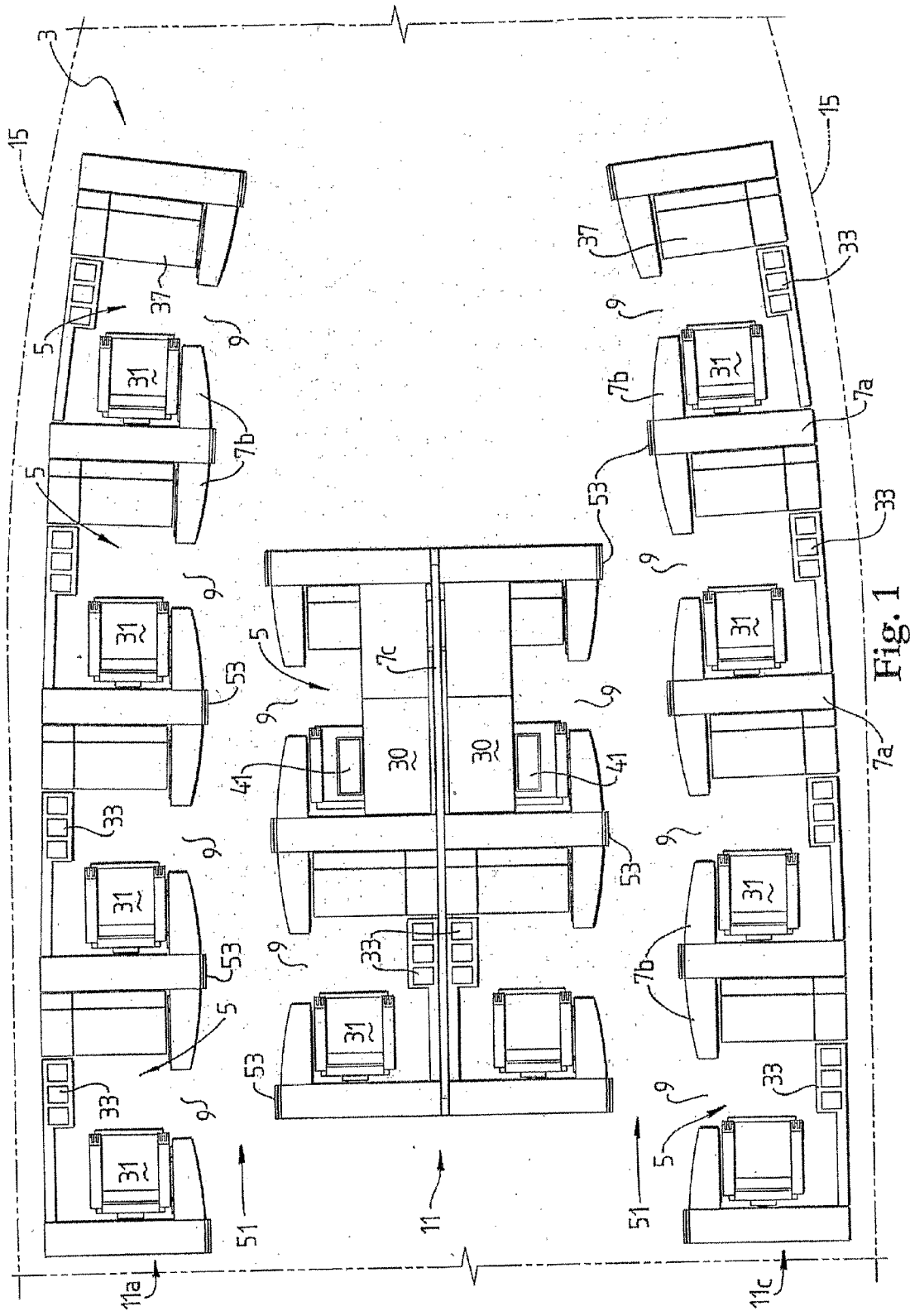
FIG. 1 is a general layout diagram of one embodiment of a cabin in accordance with the present invention which includes two outer rows and one interior row of one embodiment of a passenger compartment in accordance with the present invention.
Figure 2:
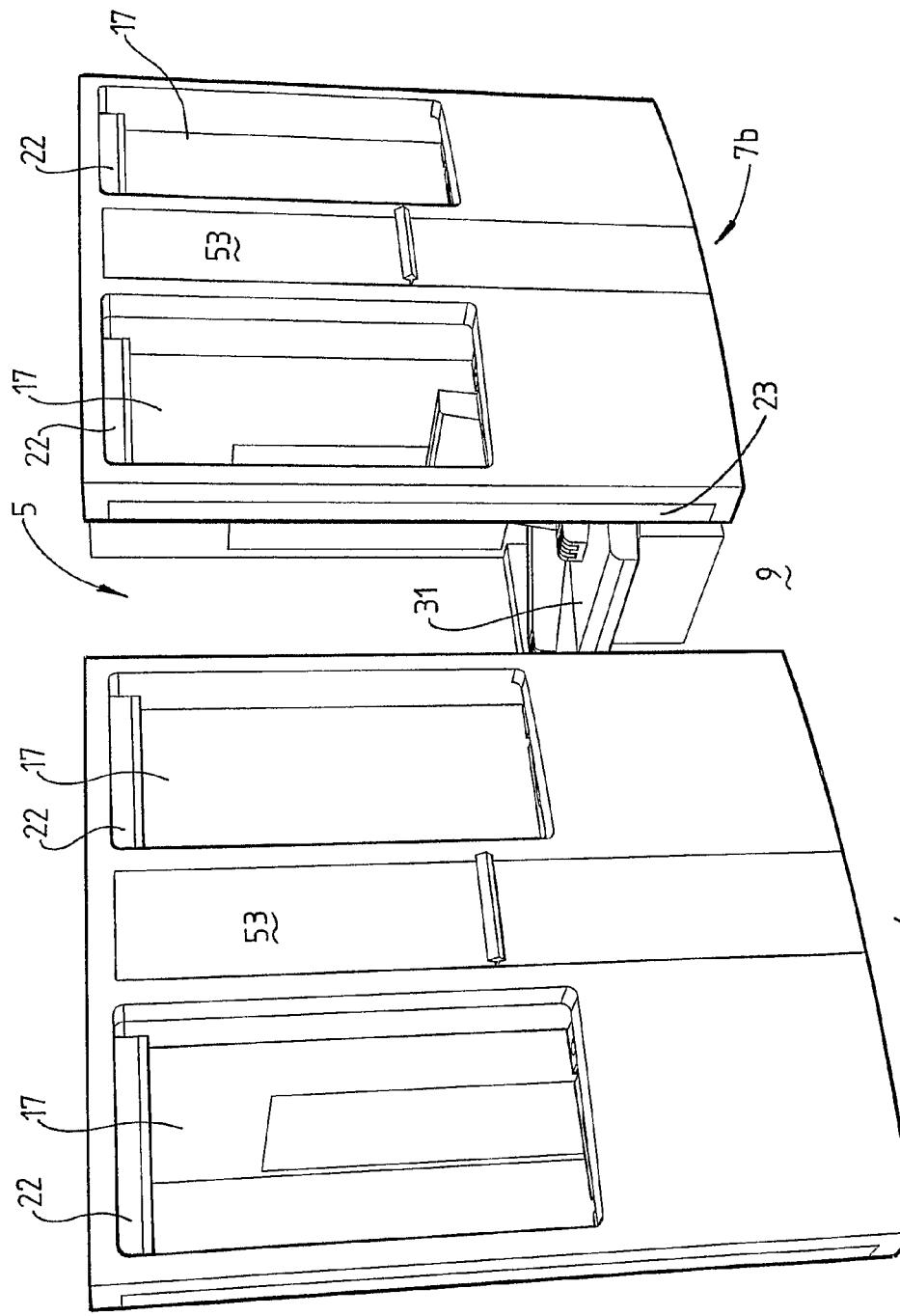
FIG. 2 is a perspective view of the outer row passenger compartment in the cabin shown in FIG. 1 as viewed from an aisle.

In each embodiment, the cabin 3 comprises a plurality of "private" passenger compartments 5 that define multi-functional compartment spaces for passengers.

The compartments 5 of each embodiment are designed so that the compartments can be completely enclosed so that passengers can have total privacy.

The compartments 5 of each embodiment are designed particularly for long-haul fights during which the passengers occupying the compartments may wish to work, relax, or sleep.

In the embodiment shown in FIGS. 1 to 19 the cabin comprises 3 rows 11a, 11b, 11c of compartments 5 arranged in a length-wise extending direction of the aircraft and separated by aisles 51.

The compartments 5 of each row 11a, 11b, 11c are accessible via doorways 9 in the walls 7b, hereinafter referred to as "doorway walls 7b", that define the aisles 51.

The doorways 9 are centrally positioned in the doorway walls 7b and divide the walls 7b into two equal-sized sections, one on each side of the walls 7b.

The two outer rows 11a, 11c of compartments 5 are positioned along opposite sides of the aircraft. The aircraft side walls 15 form outer side walls of the compartments 5. The compartments 5 in each outer row 11a, 11c also include walls 7a that extend inwardly from the aircraft side walls 15. The walls 7a form end walls of the compartments 5. The doorway walls 7b extend from the end walls 7a and form interior side walls of the compartments 5.

Each end wall 7a and the sections of the walls 7b that extend in opposite directions from the end walls 7b are essentially T-shaped arrangements.

The internal row 11b of compartments 5 comprises 2 pairs of the compartments 5 in side by side relationship. The compartments 5 in each pair have doorways 9 that open into aisles 51 on opposite sides of the internal row.

The compartments 5 in the internal row 11b are identical to the compartments 5 in the outer rows 11a and 11c in terms of furniture and layout save that the compartments 5 in each pair are separated by a dividing wall 7c that can be removed so that the compartments 5 can be converted from separate single compartments into a double compartment.

Figure 10:
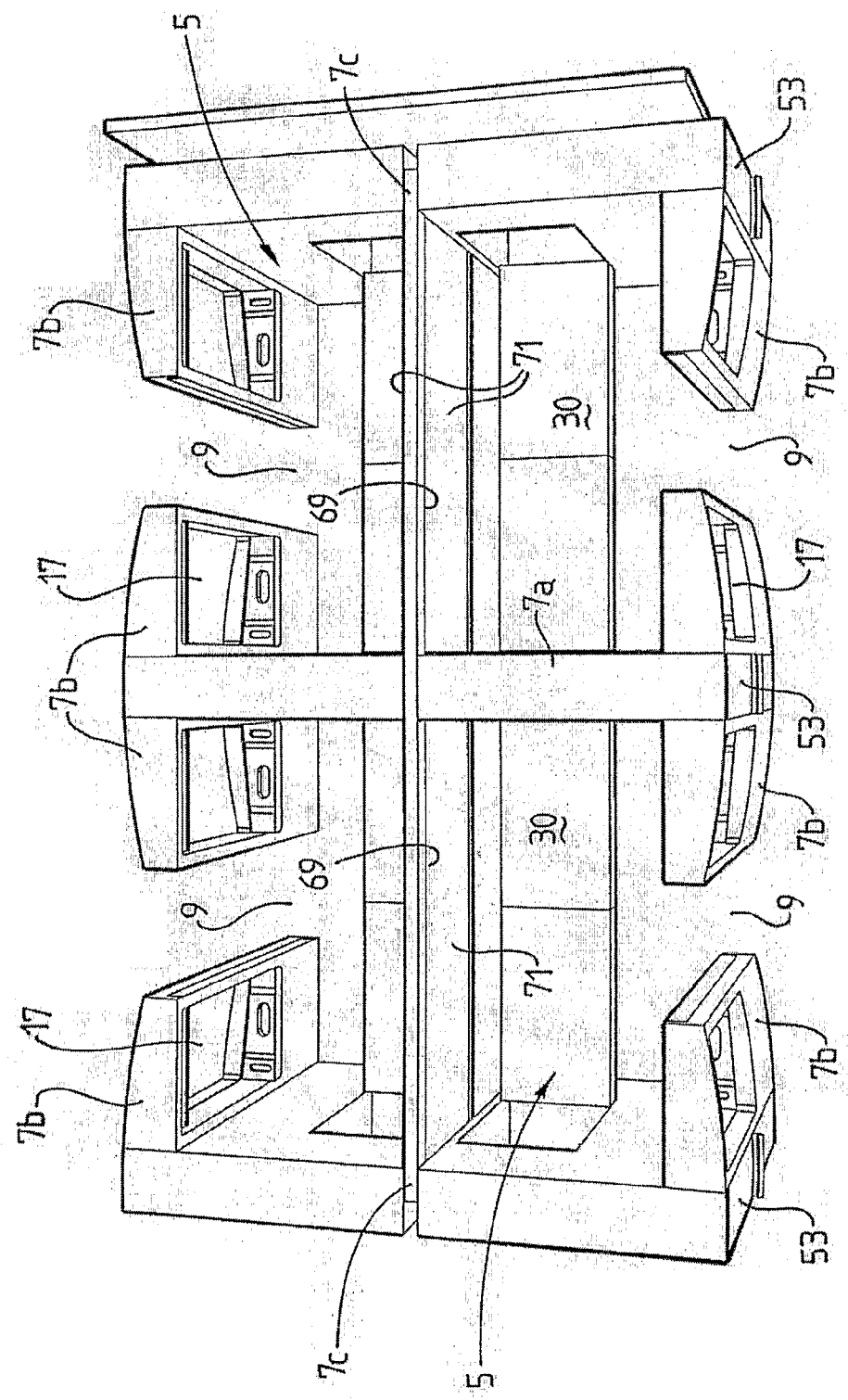
FIG. 10 is a top plan view of the interior row of compartments in the cabin shown in FIG. 1.
Figure 11:
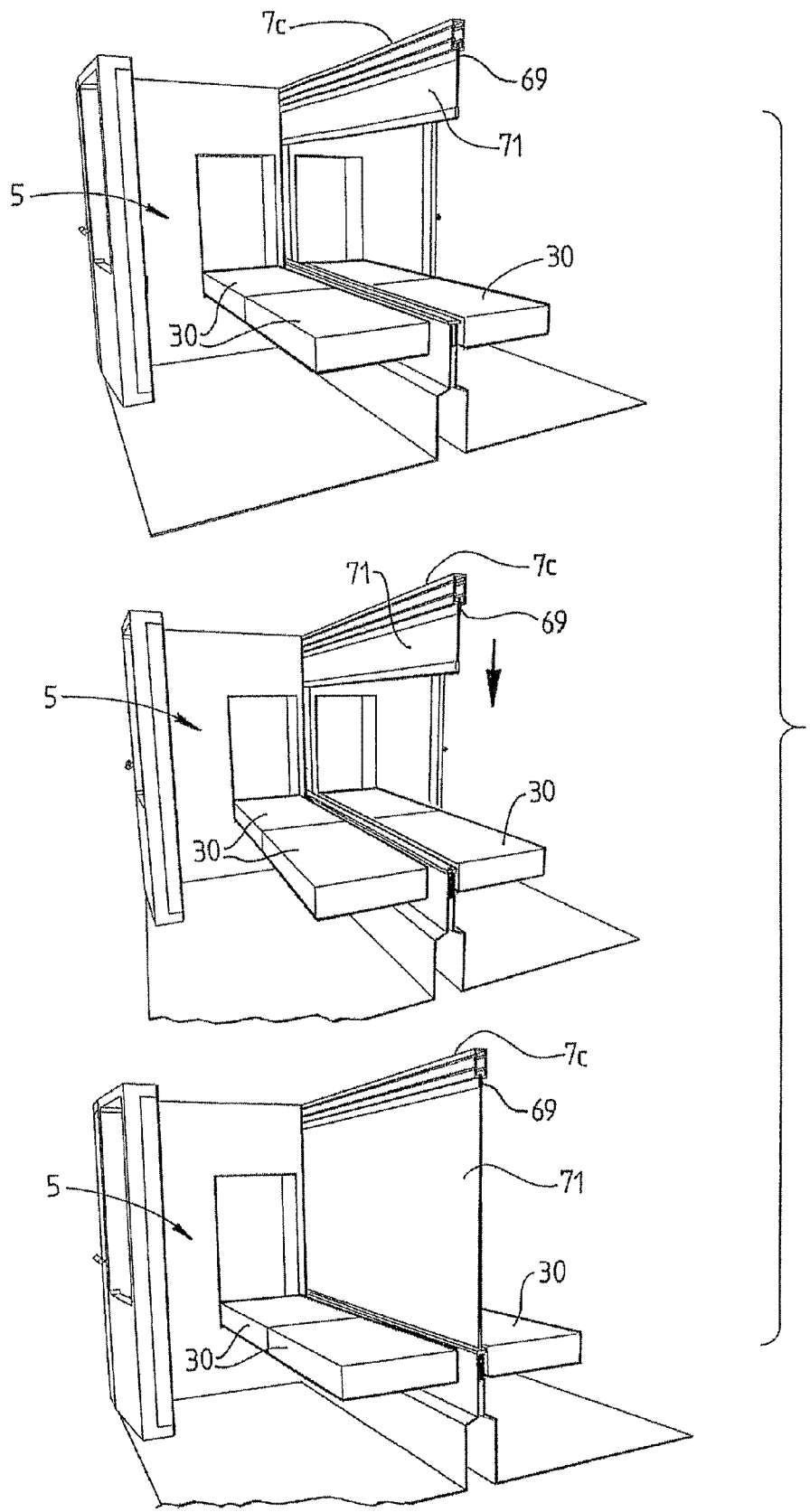
FIG. 11 is perspective views of one of the pairs of the passenger compartments shown in FIG. 10 illustrating the sequence of steps to convert the separate compartments into a double compartment.

With reference to FIGS. 10 and 11, the dividing wall 7c comprises a top rail 69 and a retractable blind 71 housed in the top rail. Conversion of the compartment simply involves raising the blind 69 from the lowered position to the raised position.

The walls 7a, 7b are continuous internal walls that are 1.6 m high and therefore ensure privacy of passengers in the compartments 5.

The aisles 51 are formed as curved aisles. The curved aisles contribute to the overall appearance of the cabin.

The curved aisles are formed by forming the doorway walls 7b as convex walls as viewed from the aisles 51 and by staggering positions of the compartments 5 so that the doorways 9 of the compartments 5 on opposite sides of the aisles 51 are not aligned.

More preferably the compartments 5 are staggered so that the doorways 9 of the compartments on one side of the aisles 51 face the doorway walls 7b on the other side of the aisles 51, and vice versa.

As is indicated above, forming the doorway walls 7b as curved walls as viewed from the aisles 51 means that there is additional space in these sections of the compartments 5 for housing furniture in the compartments 5. This is an advantage because it makes it possible to make more efficient use of the available space within the compartments 5.

The doorway walls 7b have windows 17 on both sides of the doorways 9. The windows 17 have retractable blinds 21 so that the passenger occupants can selectively create an open compartment which facilitates visual interaction with other compartments 5 in the cabin or a more private closed compartment 5.

Each compartment 5 comprises a sliding door assembly for closing the doorway 9.

The sliding door assembly of each compartment 5 comprises a pair of doors 23 that are mounted for sliding movement between retracted positions in which the doors are located in frames (not shown) in the doorway walls 7b and closed positions in which the doors 23 extend across the doorway 9 and close the compartment 5.

Figure 4:
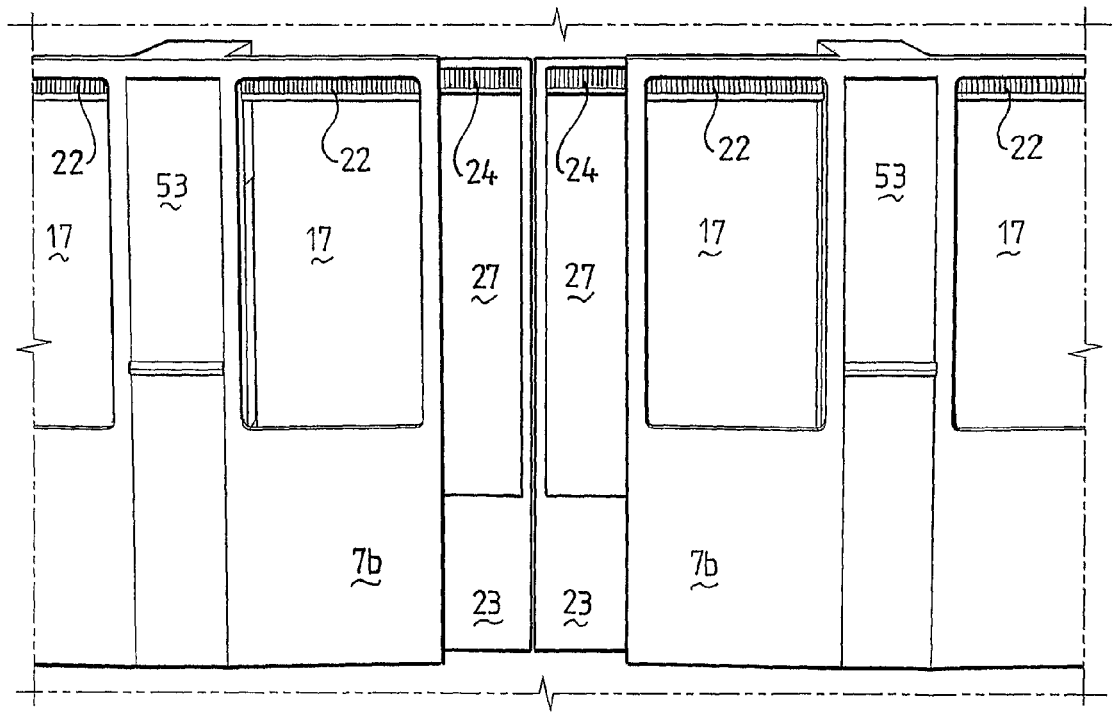
FIG. 4 is a perspective view similar to FIG. 2 with compartment doors closed and retractable blinds of the doors in an open position.
Figure 5:
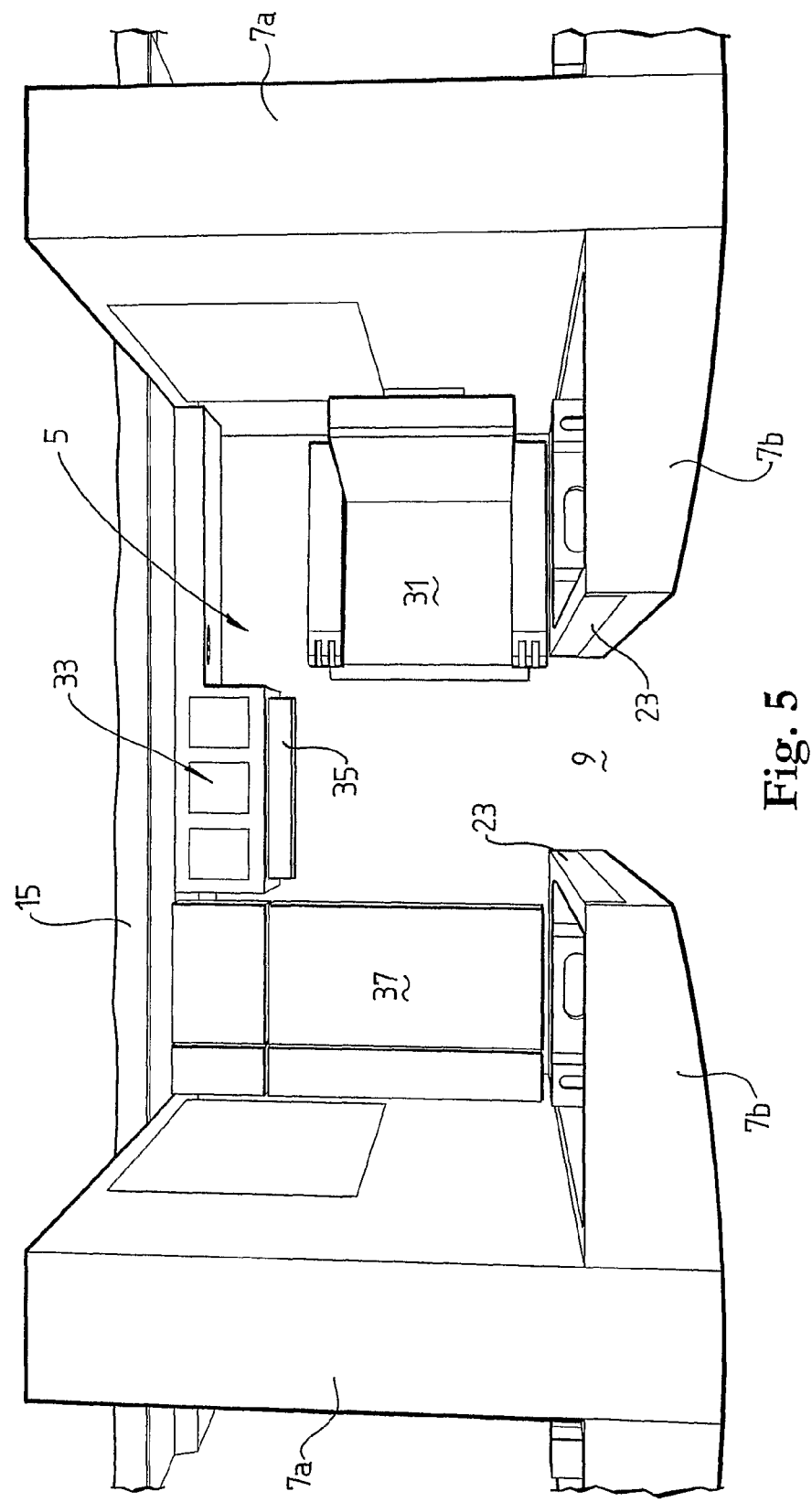
FIG. 5 is a top plan view of the compartment shown in FIG. 2 with a table assembly in a storage position.
Figure 6:
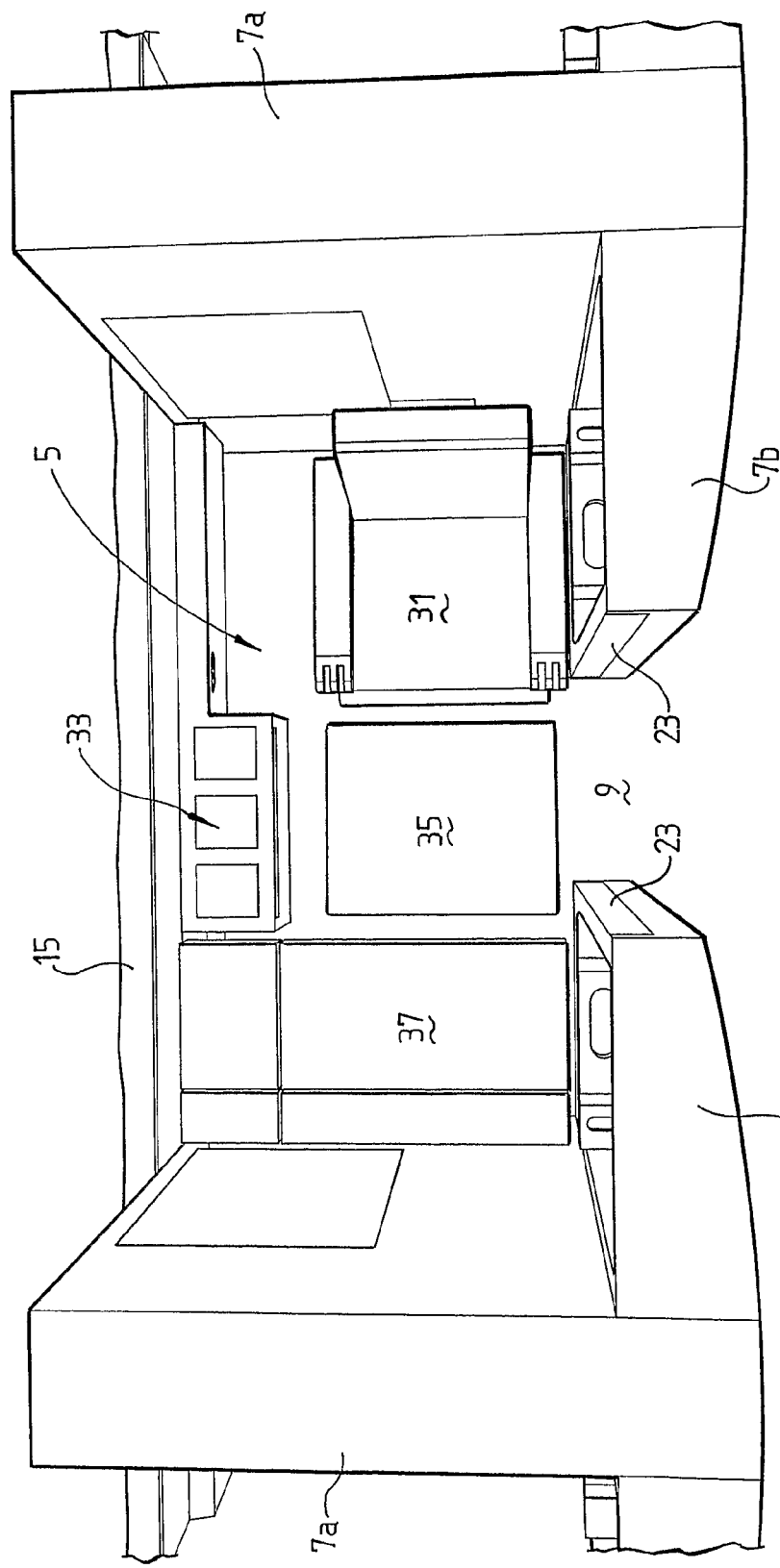
FIG. 6 is a top plan view of the compartment shown in FIG. 2 with a table assembly in an operative position.
Figure 7:
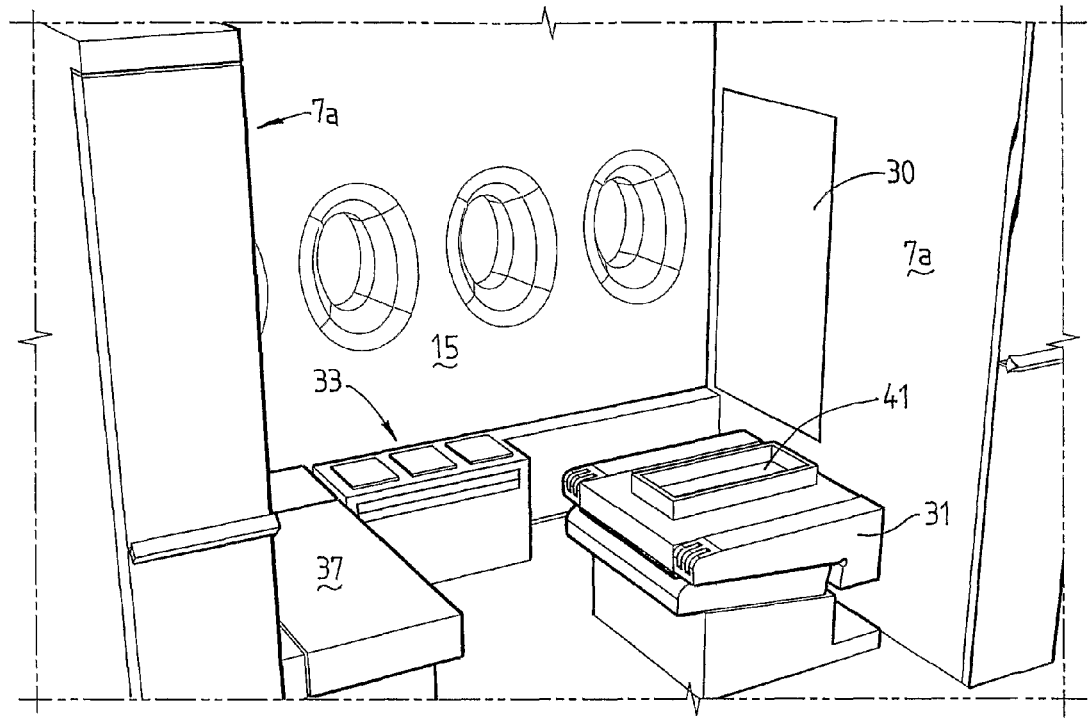
FIG. 7 is a perspective view of part of the compartment shown in FIG. 2 with a passenger chair in a folded position.
Figure 8:
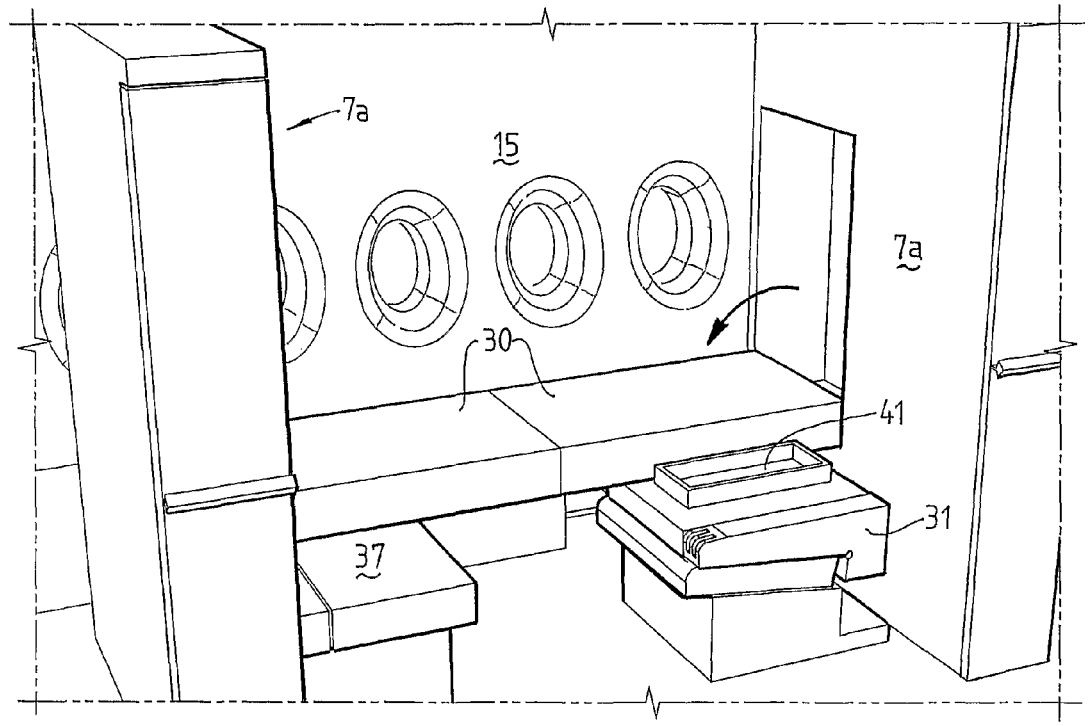
FIG. 8 is a perspective view similar to FIG. 7 which illustrate a bed in an operative position.

With reference to FIG. 4, each door 23 has a window 27. The arrangement of the doors 23 and the windows 17 in the doorway walls 7b is such that the windows 27 of the doors 23 overlap the windows 17 in the doorway walls 7b when the doors are in the retracted positions and thereby do not interrupt the view through the windows 17.

Figure 3:
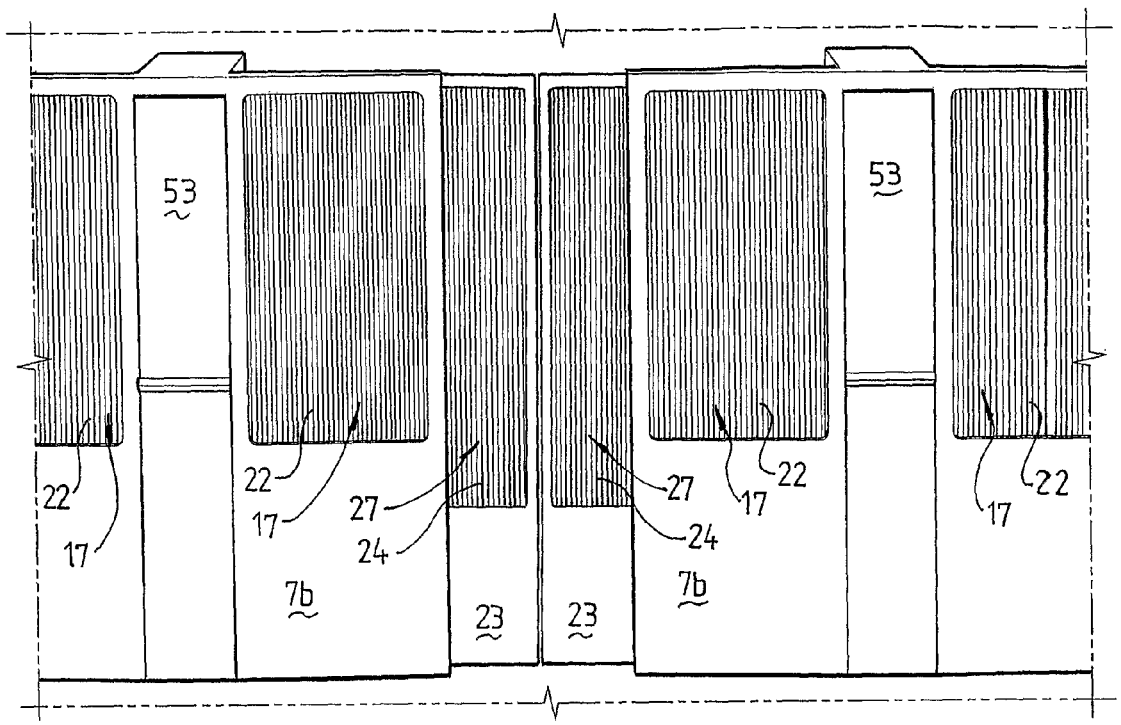
FIG. 3 is a perspective view similar to FIG. 2 with the compartment doors closed and the retractable blinds of the doors in a closed position.

With reference to FIG. 3, the sliding door assembly also includes retractable blinds 29 on the doors 23 so that the passengers can selectively create an open or a more closed private compartment. The blinds 29 are shown in a closed position in FIG. 3.

Each private passenger compartment 5 houses an extensive range of furniture required by passengers, particularly on long-haul flights.

The furniture comprises a chair 3, a cadenza 3, a table assembly 35 housed in the cadenza 33, a bi-fold bed 29 stored in one of the end walls 7a, and a seat 37 located within the compartment space.

The furniture is designed and arranged to be interactive so that the furniture can be selectively arranged in a number of different functional configurations as may be required by passengers, particularly on long-haul flights.

The chair 31 is located to one side of the doorway and is positioned against the end wall 7a on that side of the doorway 9, the seat 37 is located to the other side of the doorway 9 and is positioned against the end wall 7a on that side of the doorway, (c) the cadenza 33 is located against the wall opposite the doorway 9, (d) the table assembly 35 is housed in the cadenza 33 and is movable between a storage position within the cadenza and an operative position with a table of the table assembly 35 extending horizontally into a space between the chair 31 and the seat 37, and (e) the bed 29 is foldable between a storage position in the end wall 7a (FIG. 7) and a horizontal sleeping position within the compartment space.

The chair 31 is multi-functional. Specifically, the chair 31 is foldable between an upright position for a person to sit in the chair and a folded down position in which the chair 31 forms a support for the bed 29.

The chair 31 is specifically shaped to define a bedside table 41 when the chair is in the support position.

The seat 37 and the cadenza 33 also define supports for the bed 29. The cadenza 33 is positioned so that it can be moved vertically between a raised position in which the cadenza 33 is at a convenient height to be accessed by a person seated in the chair 31 and a lowered position in which the cadenza 33 forms a bed support.

The above-described compartment 5 is a compact and efficient use of space by virtue of the arrangement of the furniture in the compartment 5 which provides a passenger with a range of functional options for the use of the compartment 5 without the compartment appearing to be cramped.

By way of particular example, the construction of the chair 31 to be a foldable chair that can be used as a support for the bed 29 makes it possible to locate the substantial components of a luxury chair and a bed within a relatively confined space without the compartment being a cramped space. In effect, the foldable chair 31 allows the compartment 5 to be converted from one functional configuration to another, quite separate, functional configuration within a relatively confined space.

The conversion that is made possible by the foldable chair means that the entire compartment space is available for each separate function, hence providing an impression a relatively spacious compartment.

The cabin also includes the following features:
Wardrobes.
Breakfast tables.
Storage spaces and a vanity unit in the cadenza 33.
Baby bassinet.
Shelving.
Control panel for lighting and entertainment system.
Wall-mounted entertainment display screen.

Figure 9:
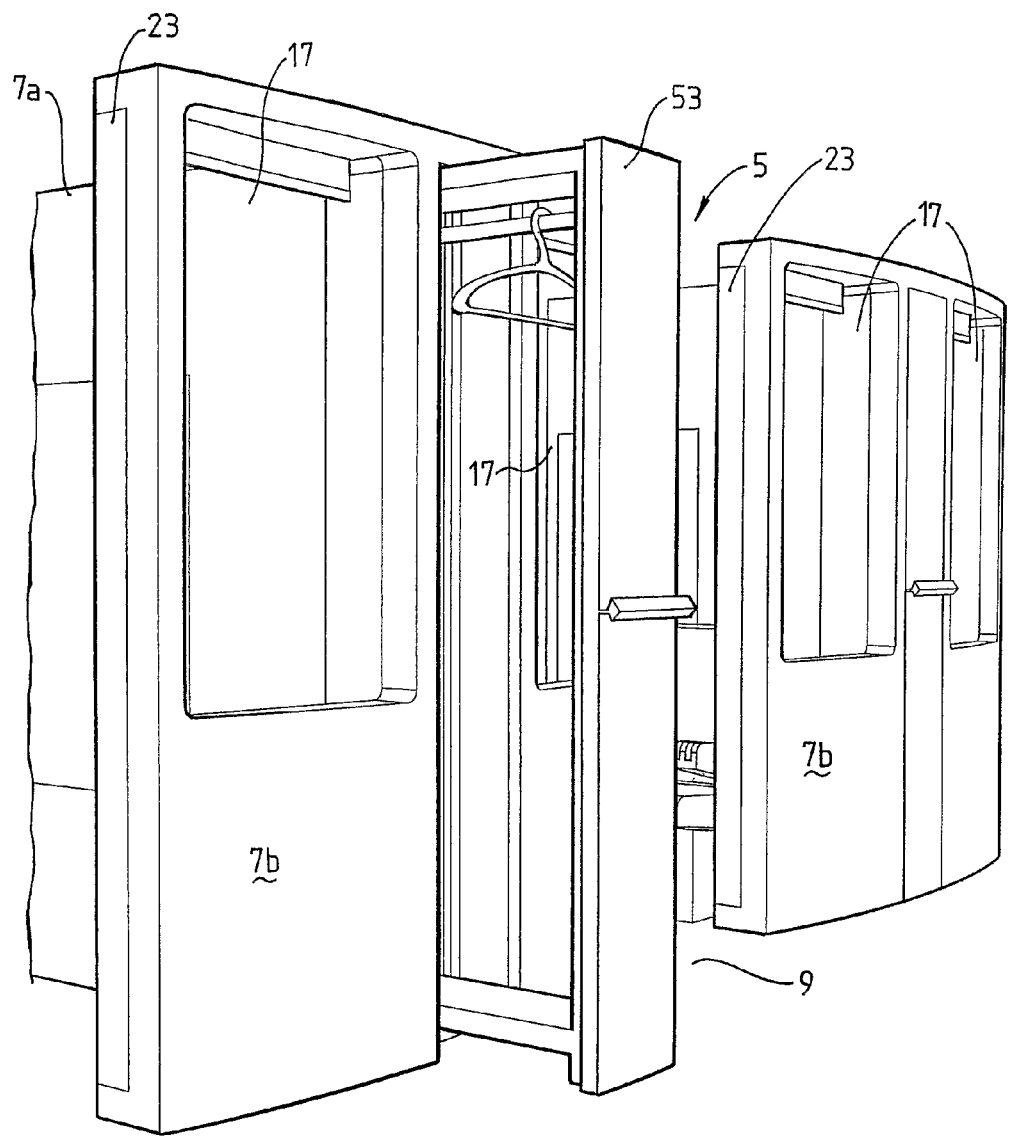
FIG. 9 is a perspective view of the compartment shown in FIG. 2 which illustrates a wardrobe in an operative position extending into a passenger aisle.
Figure 9:
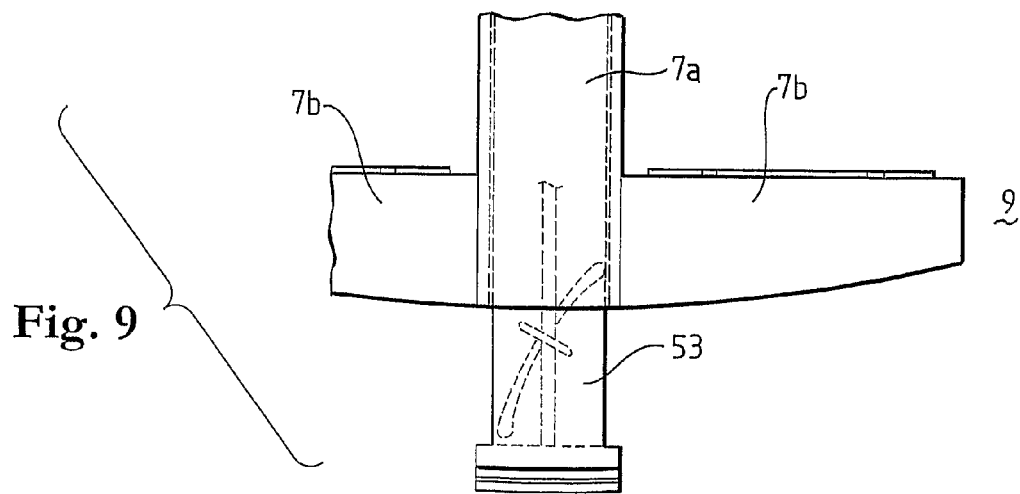

With reference to FIG. 9, the wardrobes 53 are in the form of wardrobe frames that are slidably mounted within the end walls 7a. As can be appreciated from the figure, the wardrobe frames are arranged for sliding movement from storage positions within the end walls 7a to access positions extending into the aisles 51. The access positions provide convenient access for passengers. Moreover, the location of the wardrobes 53 within the end walls 7a makes it possible for the wardrobes 53 to be of sufficiently large size to accommodate business suits etc in a free-hanging form.

Figure 17:
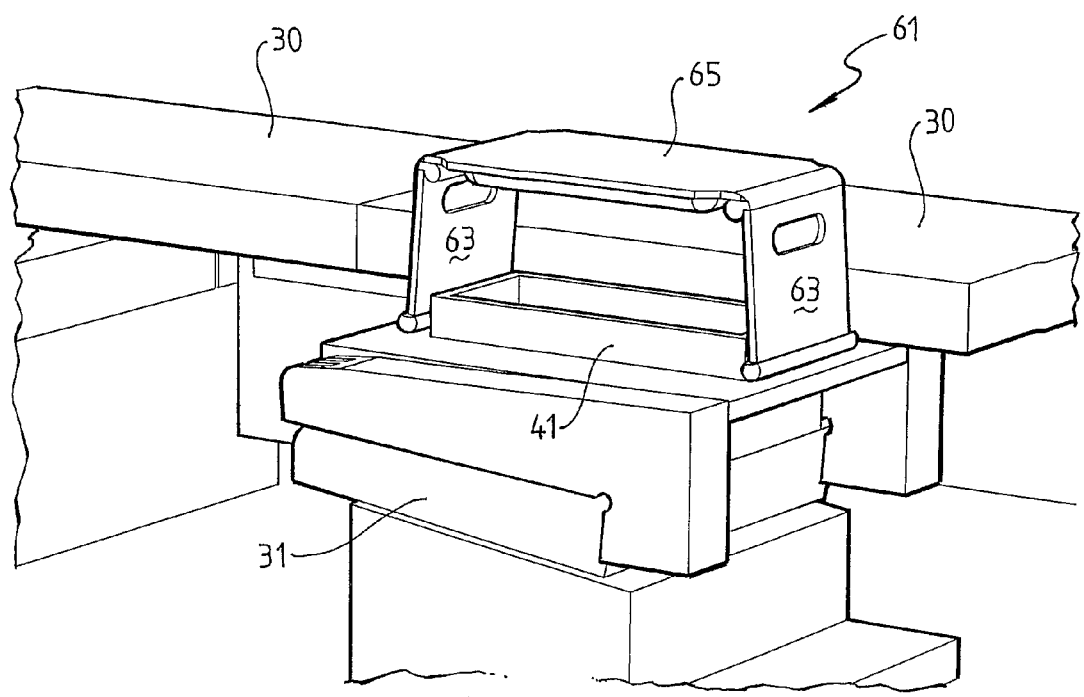
FIGS. 17 to 19 are perspective and side and top elevation views of a service tray of the compartment shown in FIG. 2.
Figure 18:
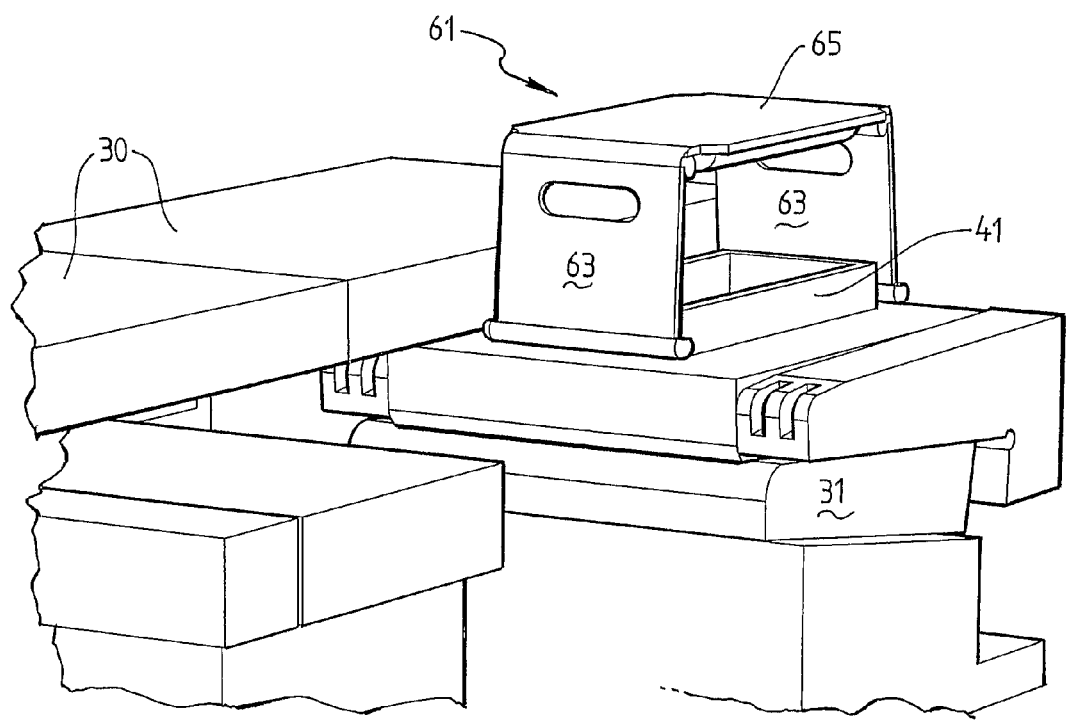
Figure 19:
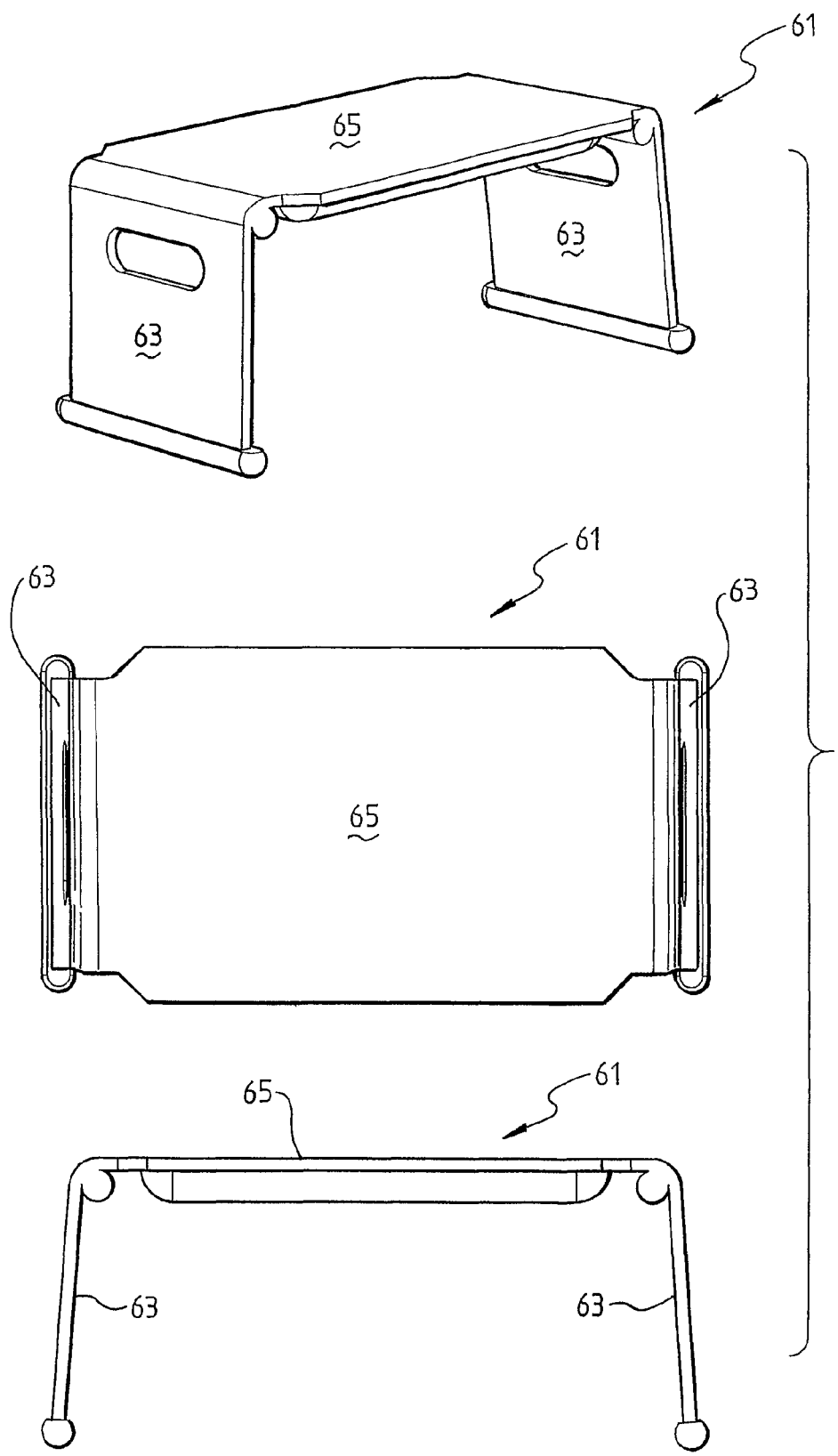

FIGS. 17 to 19 illustrate an embodiment of a service table 61 that is adapted to be positioned on the bedside table 41 of the chair 31 when the chair is in the folded down position. The service table 61 provides convenient access for a passenger in the bed 29. The service table 61 is generally U shaped and includes legs 63 extending from a platform 65.

Figure 15:
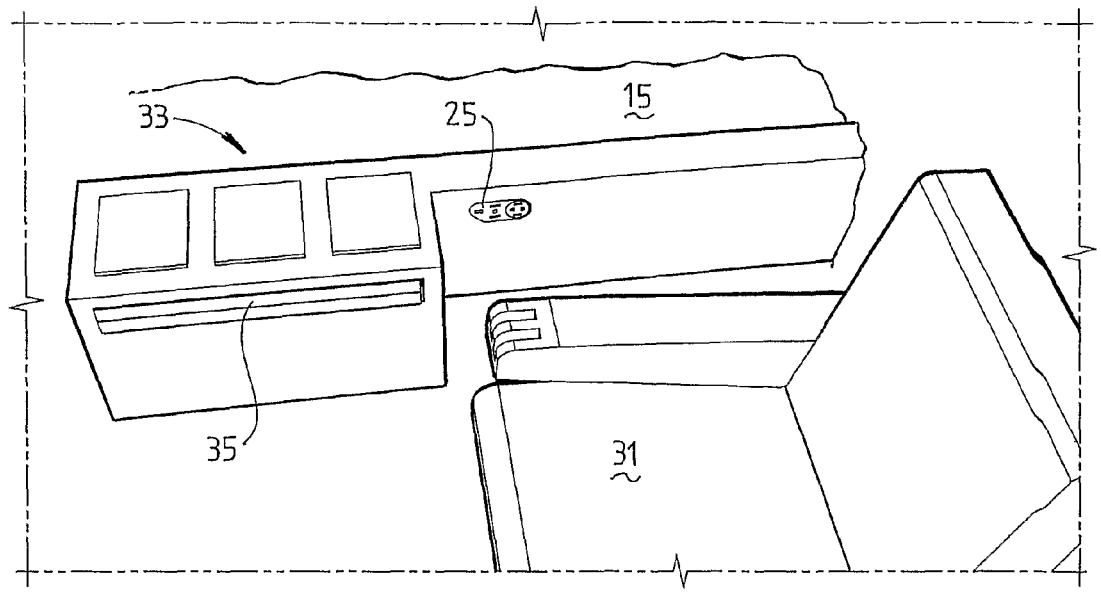
FIGS. 15 and 16 are perspective views of a section of the compartment shown in FIG. 2 which illustrate a cadenza of the compartment.
Figure 16:
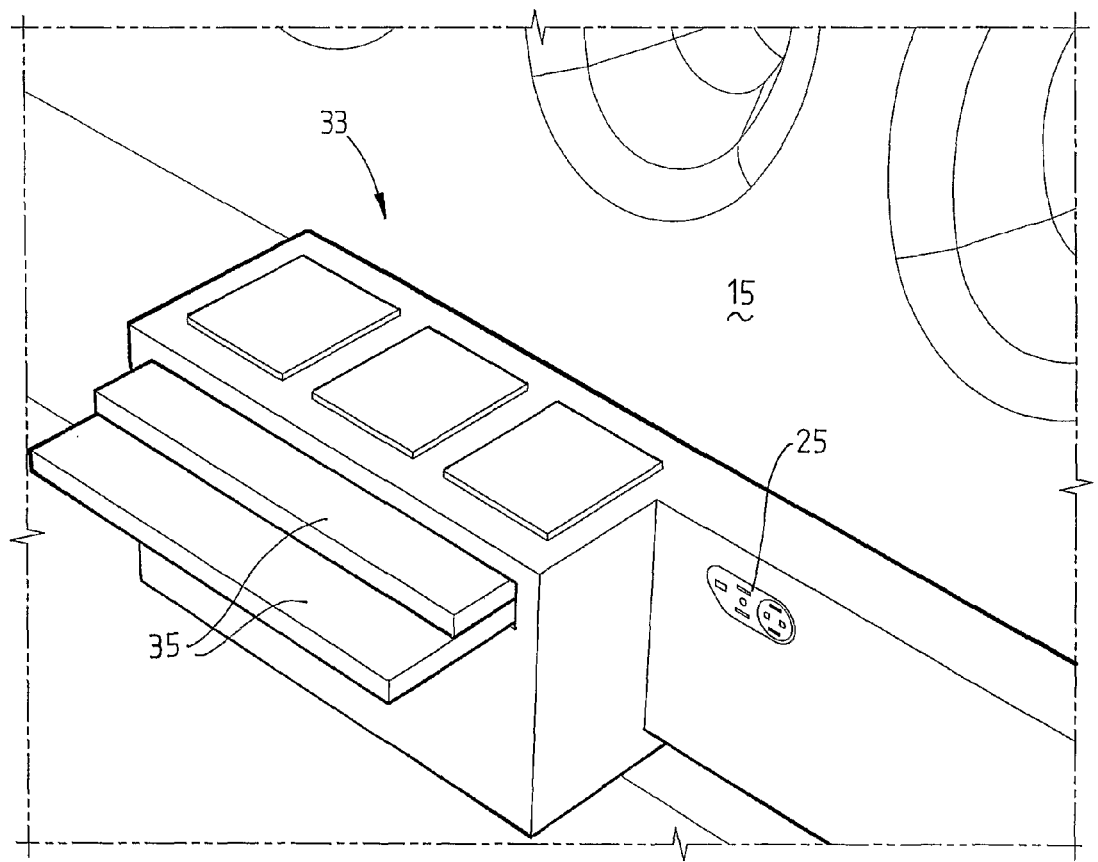

The cadenza 33 includes a series of storage compartments and an in-built vanity unit and other features, as illustrated in FIGS. 15 and 16.

Figure 12:
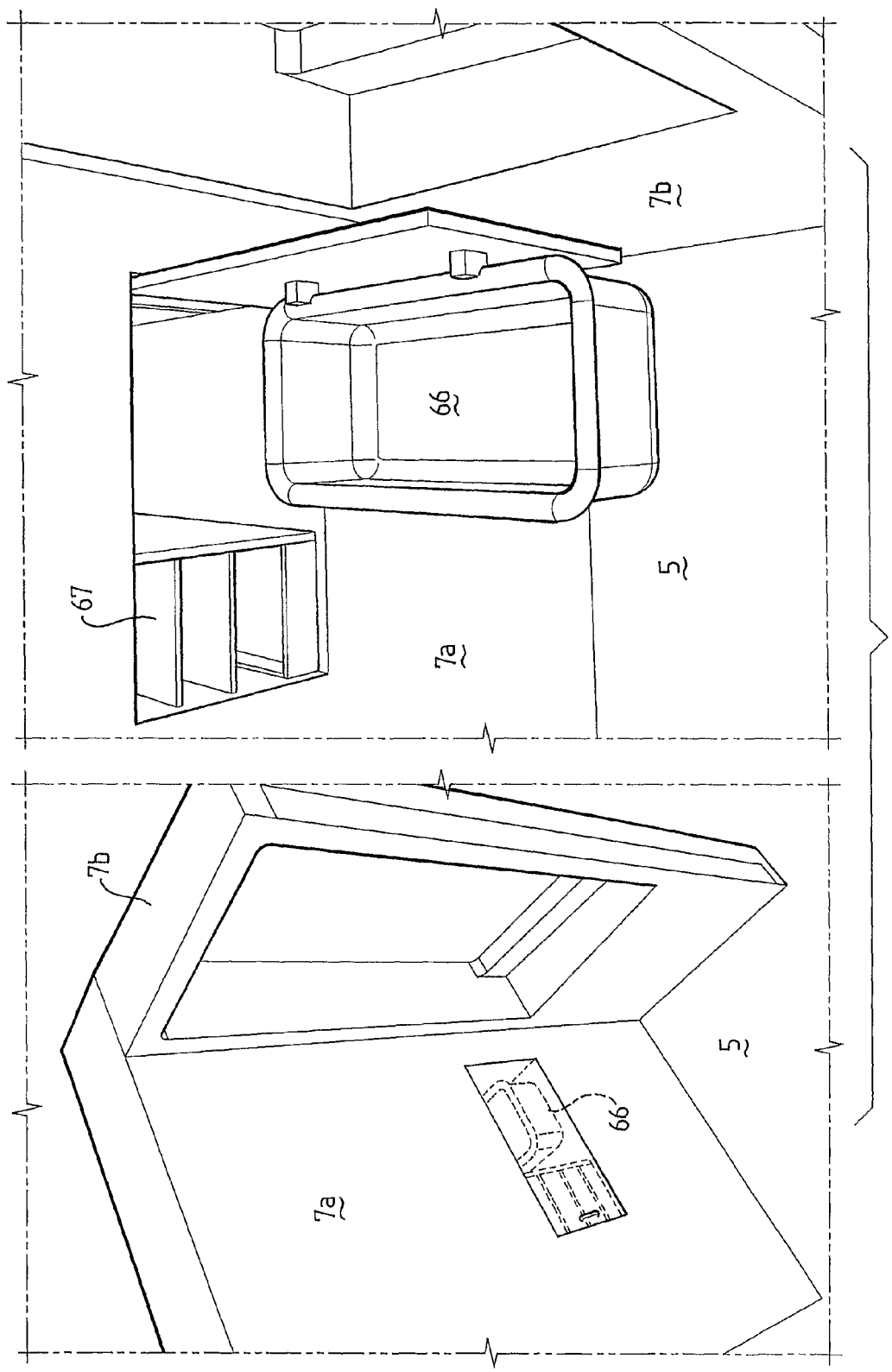
FIG. 12 is perspective views of a section of the compartment shown in FIG. 2 which illustrates a baby bassinet in the compartment.

In addition, each compartment 5 includes provision for a baby bassinet 65 and storage shelving 67 within the end walls 7a of the compartment. This feature is illustrated in FIG. 12.

Figure 13:
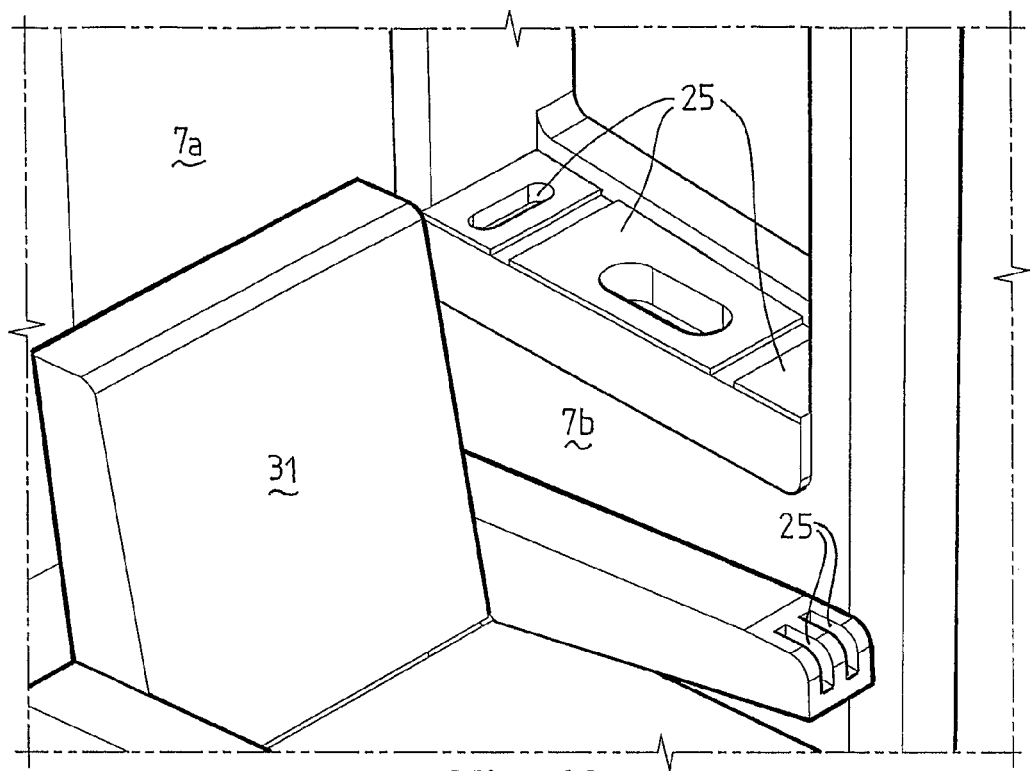
FIG. 13 is a perspective view of a section of the compartment shown in FIG. 2 which illustrates a control panel and other utilities of the compartment.
Figure 14:
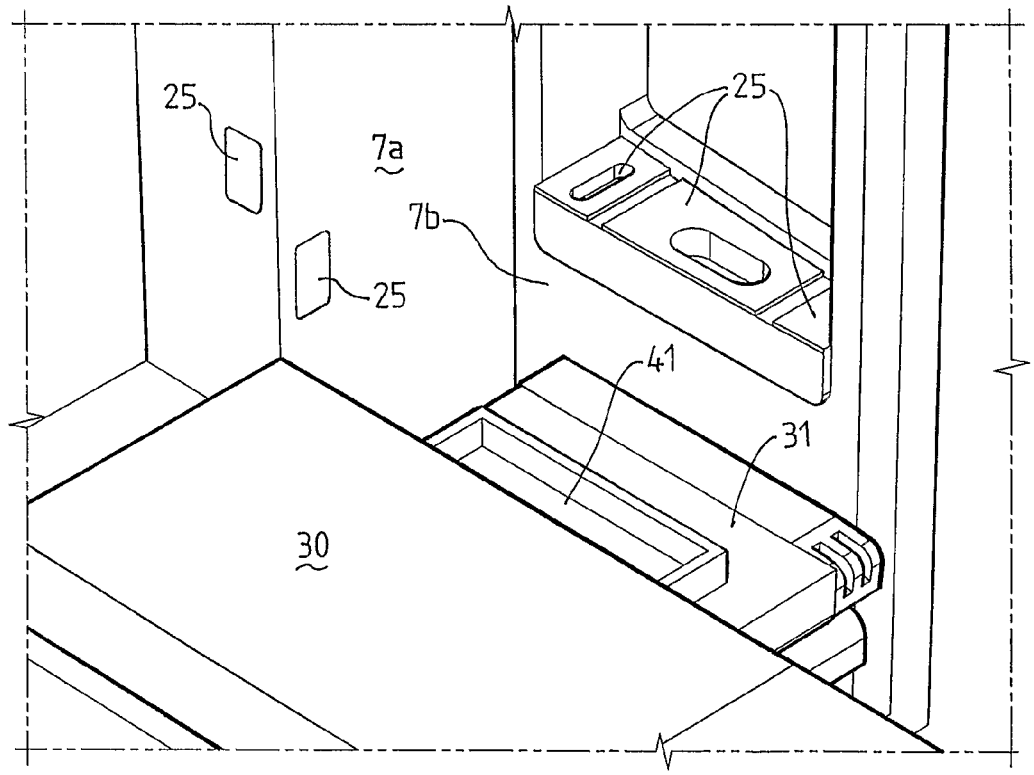
FIG. 14 is a perspective view of a section of the compartment shown in FIG. 2 which illustrates bed controls of the compartment.

Each compartment 5 also includes a series of standard utilities, such as control units, as illustrated in FIGS. 13 and 14.

In the embodiment of the cabin shown in FIGS. 20 to 39, the cabin comprises 3 rows 11a, 11b, 11c of compartments 5 arranged in a length-wise extending direction of the aircraft.

The two outer rows 11a, 11c are positioned along opposite sides of the aircraft with the aircraft side walls 15 forming compartment walls.

The central row 11b is positioned between and is separated from the outer rows by length-wise extending aisles.

The positions of the compartments 5 are staggered so that the doorways 9 of the compartments 5 on opposite sides of the aisles do not directly face each other. This feature enhances the privacy of the compartments.

The doorway walls 7 are formed as louvered walls so that the passenger occupants can selectively create an open compartment which facilitates visual interaction with other compartments in the cabin or a more private closed compartment.

Each compartment 5 comprises a sliding door assembly for closing the doorway 9.

The sliding door assembly comprises an upper rail 51 and a curtain 55 supported by the rail.

The rail 51 is mounted for sliding movement between a retracted position in which the rail is located in the doorway wall 7 on one side of the doorway 9 and an operative, ie closed, position in which the rail 51 extends across and blocks the doorway 9.

The curtain 55 is arranged to fold in a concertina fashion. Accordingly, the curtain 55 folds against the doorway wall 7 when the rail 51 is slid into the retracted position and the curtain 55 expands and closes the doorway 9 when the rail 51 is in the operative position.

The sliding door assembly also comprises a member (not shown) on the opposite side of the doorway 9 that is adapted to retain the rail in the operative position.

Each private passenger compartment 5 houses basic functional furniture required by passengers, particularly on long-haul flights.

The furniture comprises a chair 21, a work desk 23, a table assembly 25, and a seat 27 located within the compartment space.

As with the previous embodiment, the furniture is designed and arranged to be interactive with each other so that the furniture can be selectively arranged in a number of different functional configurations as may be required by passengers, particularly on long-haul flights.

More specifically, the furniture is designed and arranged to be movable between a range of positions to re-configure the compartment space.

As with the previous embodiment, the configurations comprise relaxation, work, entertainment, and sleep configurations.

More specifically, the private compartment comprises the following combination of furniture: (a) a chair 21 in one corner of the compartment, (b) a bench seat 27 adjacent a wall opposite the chair when the chair is in a take-off position and facing in a forward travel direction of the aircraft, (c) a work desk 23 adjacent a wall that is in a lengthwise-extending direction of the aircraft, (d) a table assembly 25 movable between a storage position against the same wall as the work desk 23 and an operative position with a table of the table assembly 25 extending horizontally in a space between the chair 21 and the seat 27, and (e) a bed 29 movable between a raised storage position and a lowered operative position on the work desk.

Figure 20:
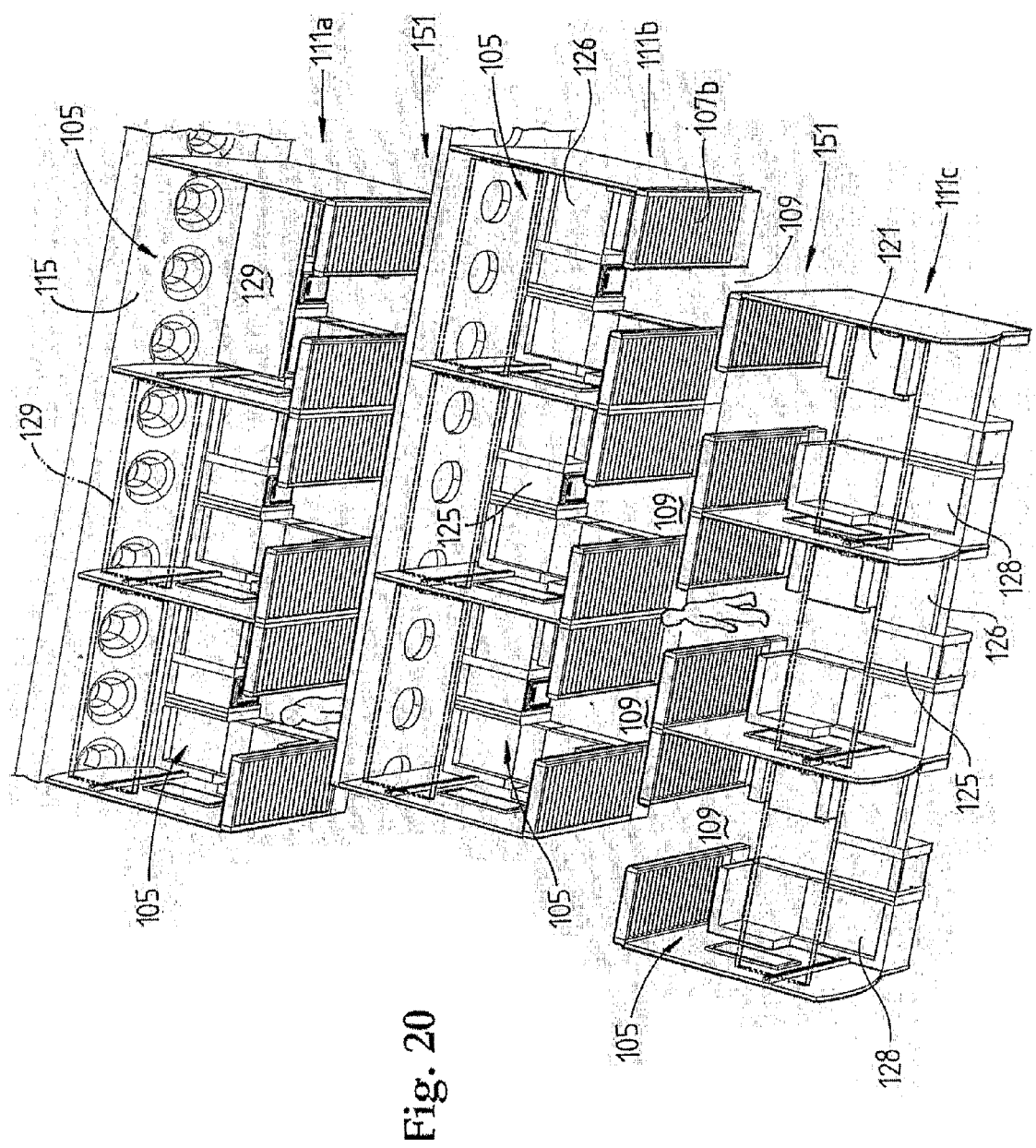
FIG. 20 is a schematic diagram that illustrates another embodiment of a cabin in accordance with the present invention.
Figure 21:
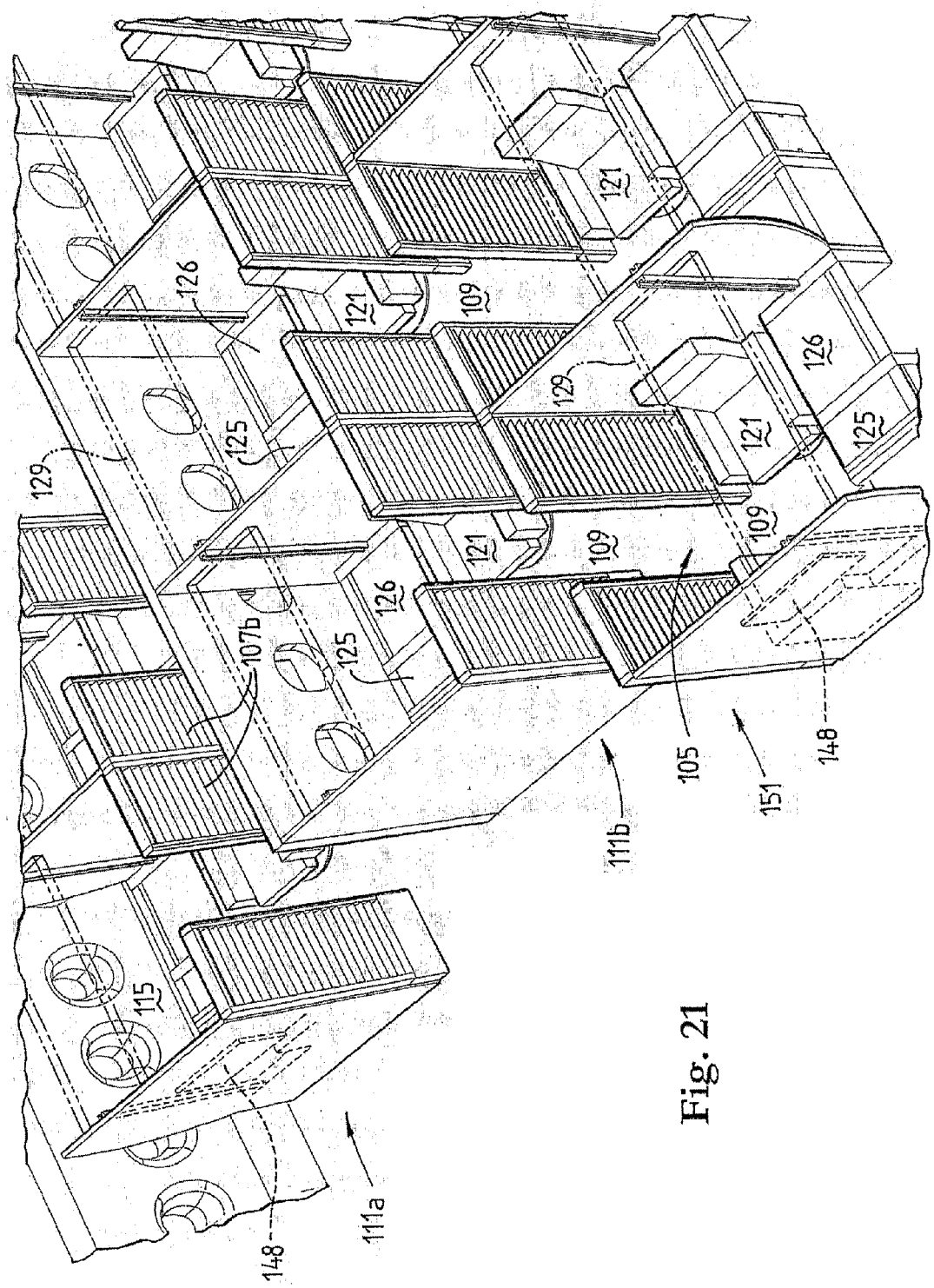
FIG. 21 is a detailed view of part of the cabin shown in FIG. 20 viewed in a different direction to that of FIG. 20.
Figure 22:
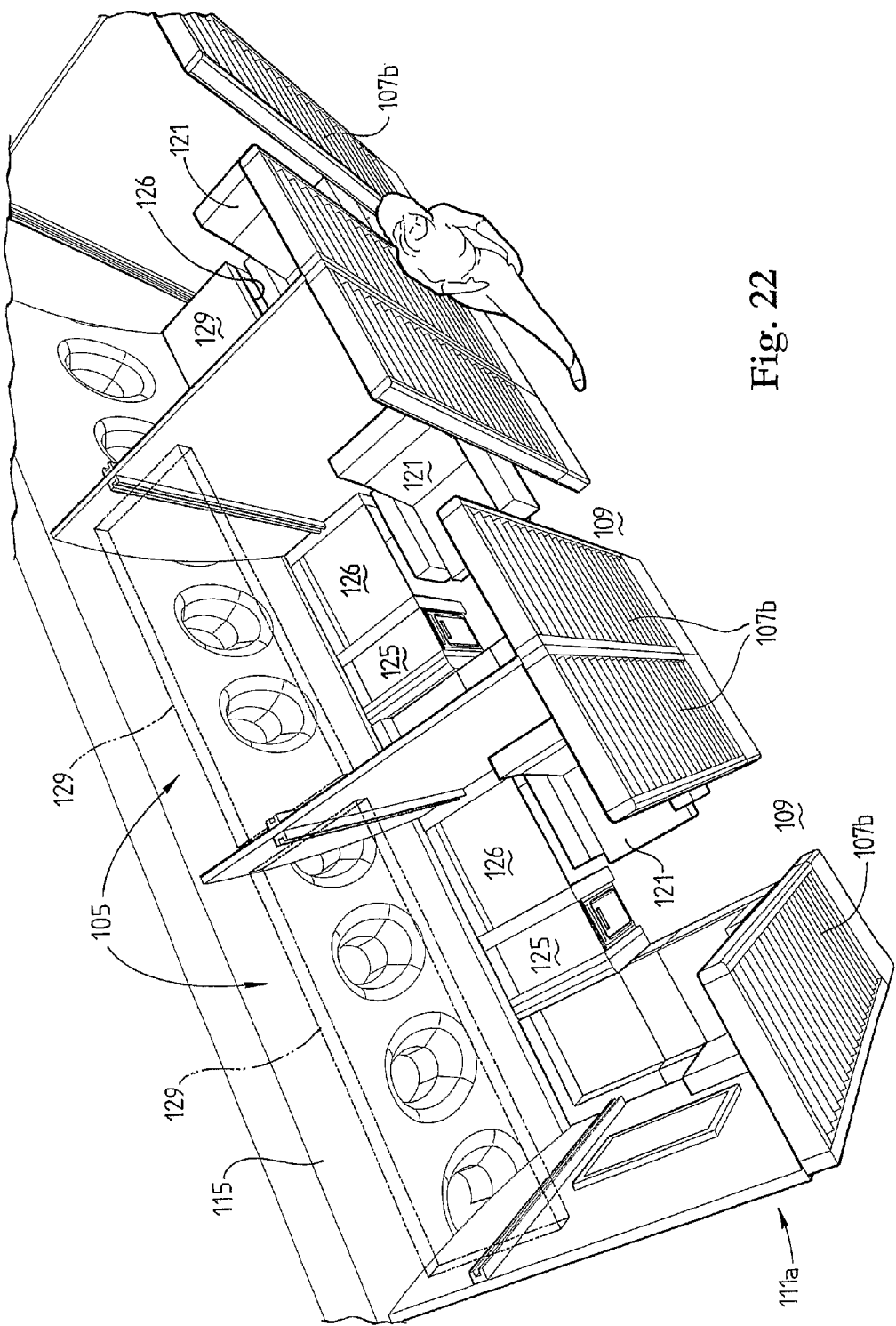
FIG. 22 is a further detailed view of another part of the cabin shown in FIG. 20 viewed in a different direction to that of FIGS. 20 and 21.
Figure 23:
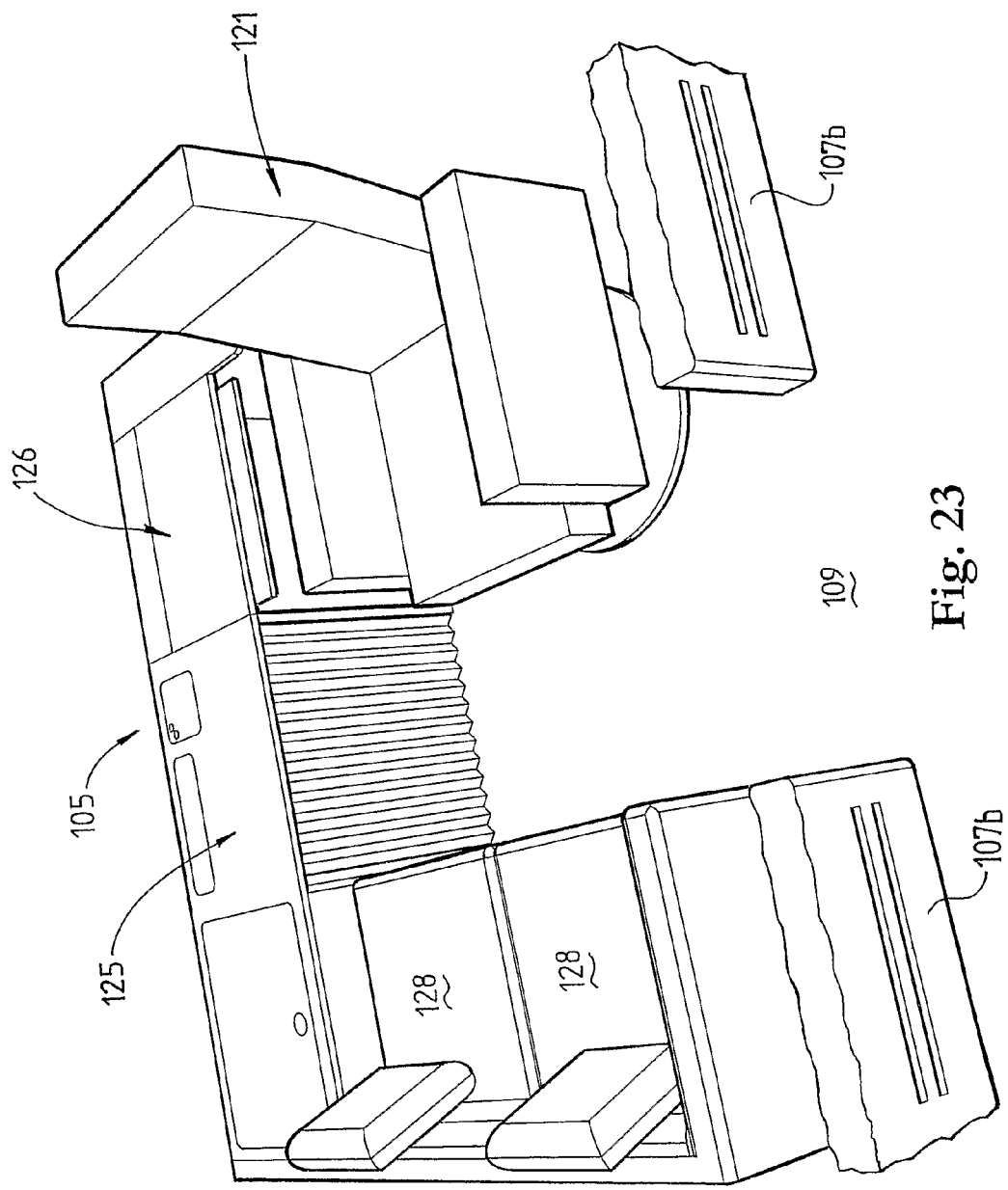
FIG. 23 is a top perspective view of one private passenger compartment in the cabin shown in FIG. 20 in one compartment configuration.
Figure 24:
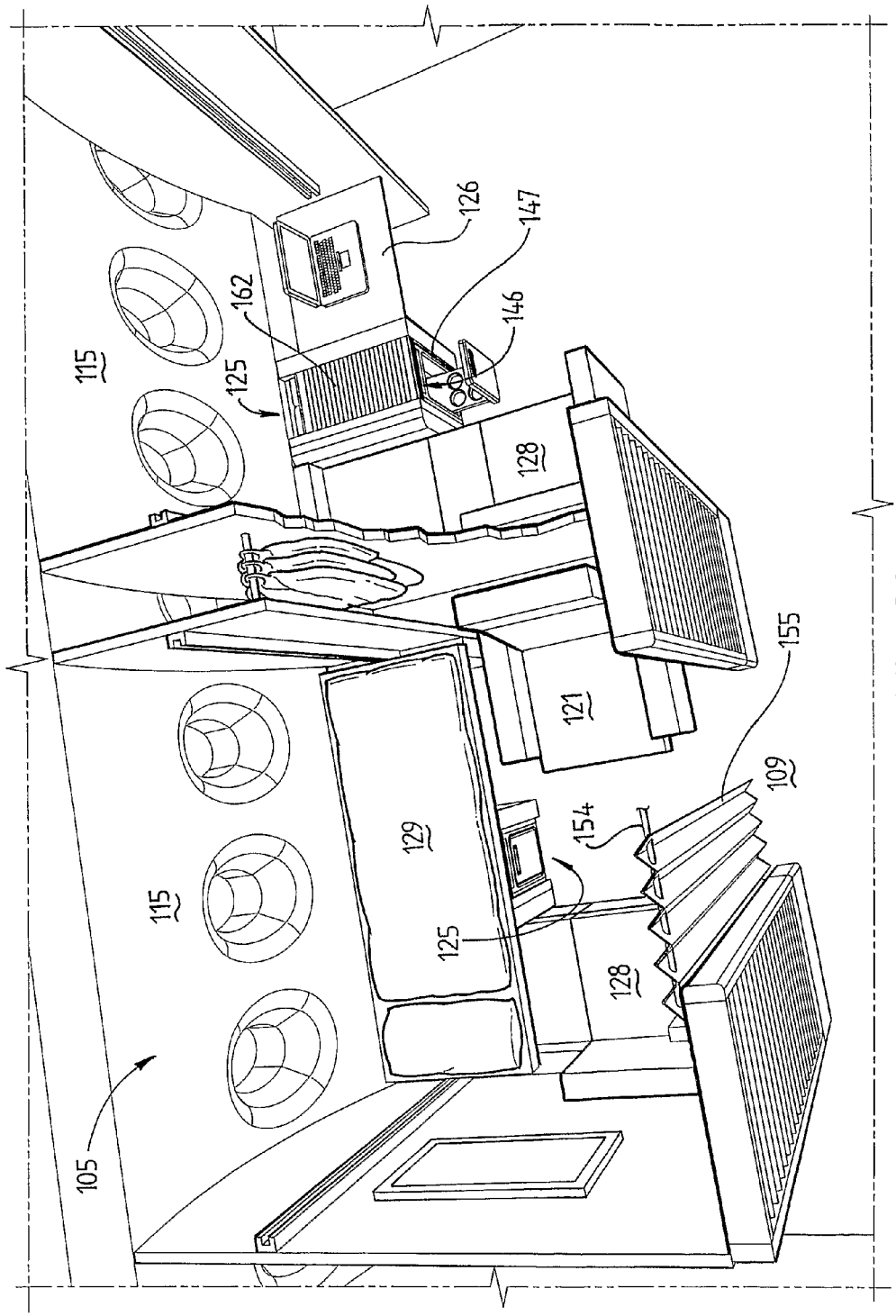
FIG. 24 is another top perspective view of the private passenger compartment shown in FIG. 23 in another compartment configuration.
Figure 25:
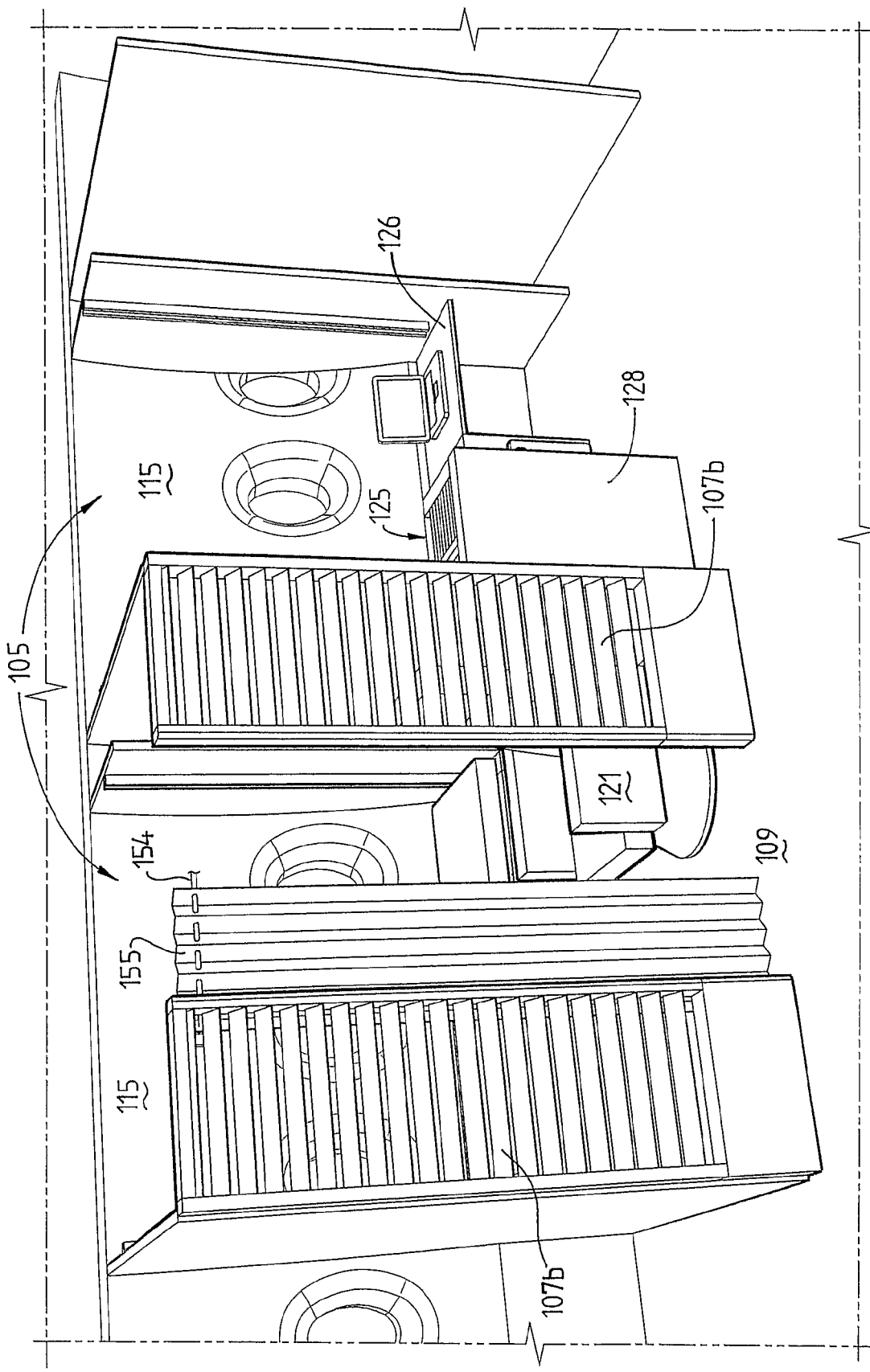
FIG. 25 is a side view of the private passenger compartment shown in FIGS. 23 and 24 viewed from within the aircraft cabin.
Figure 26:
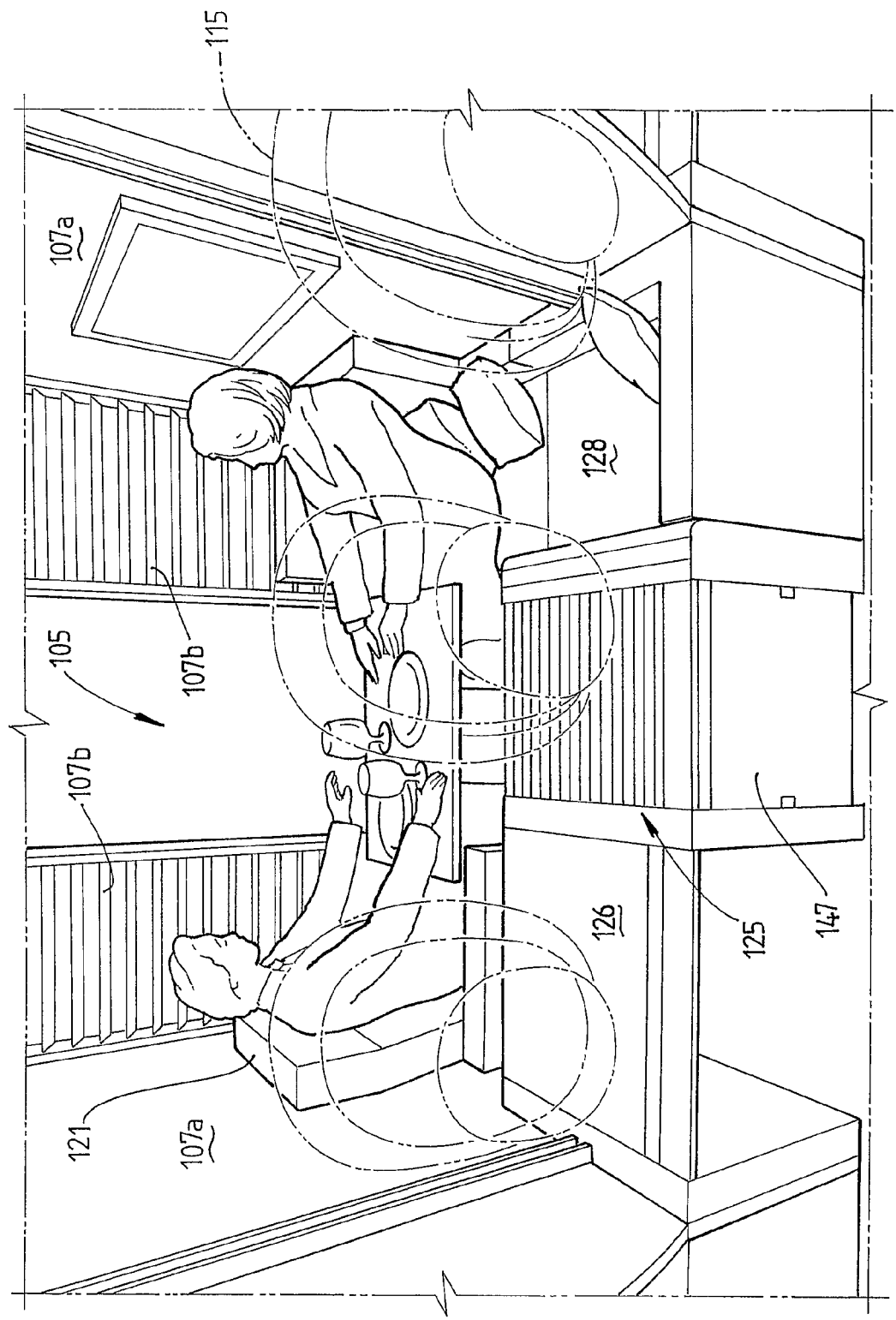
FIG. 26 is a side view of the private passenger compartment shown in FIGS. 23 and 24 viewed from outside the cabin compartment.

The chair 21 is arranged so that it can swivel between a range of positions. For example, the chair 21 can be positioned in an aircraft take-off position so that a person in the chair faces a forward travel direction of the aircraft, as shown in FIGS. 20, 24, and 25. In addition, the chair 21 can be positioned so that the person faces the work desk 25, as shown in FIG. 22 (the rearward compartment shown in the figure).

The chair 21 is an adjustable chair, with a chair back, seat and foot-rest that can be placed in a range of positions to meet passenger requirements. The chair may be of a conventional construction.

Figure 27:
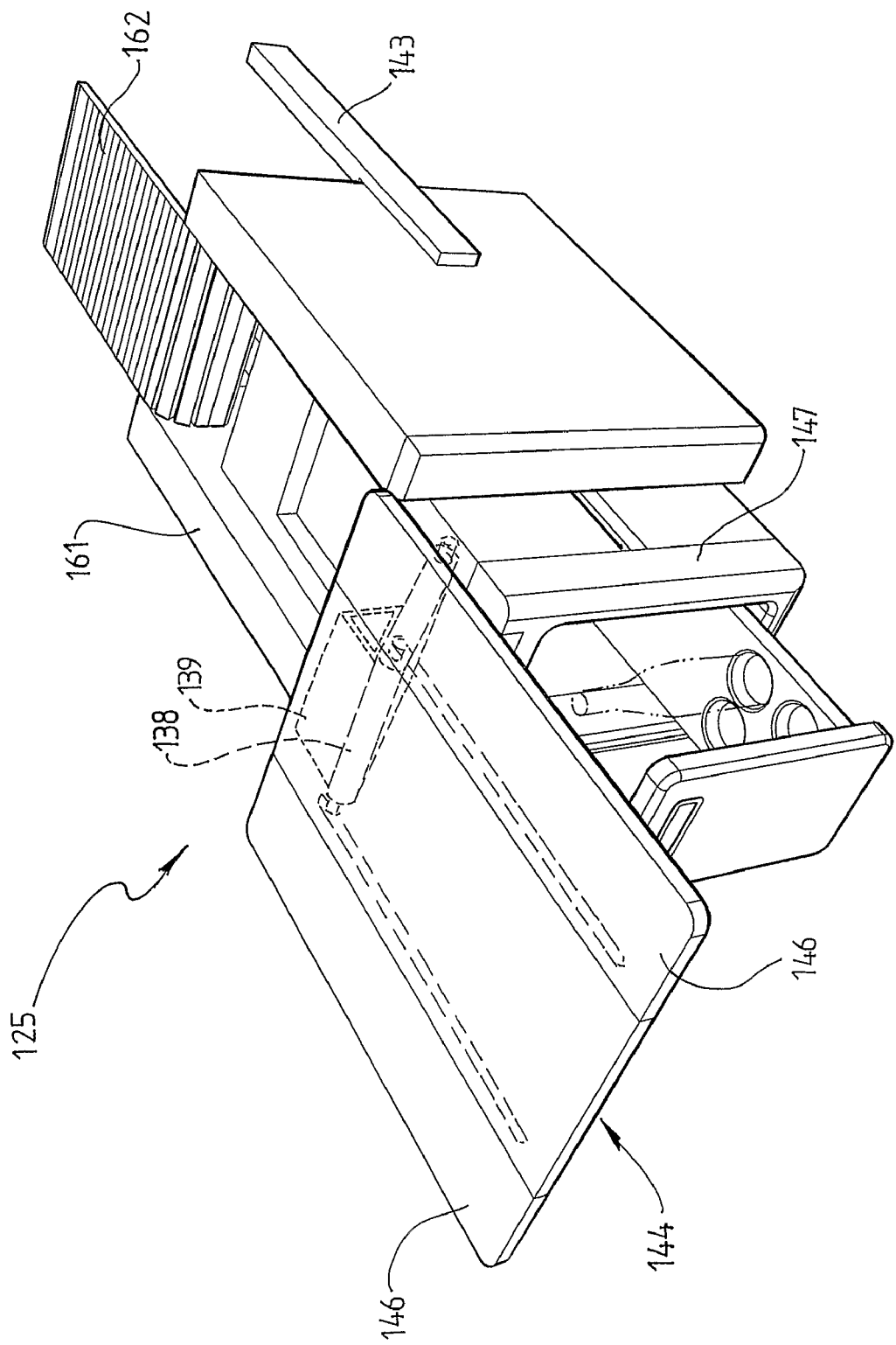
FIG. 27 is a perspective view of the table of the private passenger compartment shown in FIGS. 23 to 26 in an operative position.

FIG. 27 shows the table assembly 25 in an operative position.

With reference particularly to FIG. 27, the table assembly 25 comprises a table 33 that has a central panel and two side wings 35 that can be folded onto the central panel.

The table assembly 25 also comprises a base member 41 that, when mounted in a compartment, is supported for sliding movement between the storage position adjacent the compartment side wall and the operative position between the chair 21 and the seat 27. The base member 41 is in the form of a straight-sided rectangular cabinet that defines a storage compartment. The base member 41 is supported for sliding movement in a compartment by a track assembly, identified in part by the rail 43 mounted to and extending rearwardly from the base member.

The table assembly 25 also comprises a support arm 37 that interconnects the table 33 and the base member 41 and facilitates moving the table 33 from the storage position to the operative position.

The support arm 37 is pivotally mounted at a lower end to a forward part of an upper section of the base member 41.

The support arm 37 is also pivotally mounted at an upper end to an underside of the table 33. The support arm 37 is foldable between a storage position in which the support arm 37 (and the table 33) lies flat on top of the base member 41 and an operative position in which the support arm 37 is angled forwardly (as shown in FIGS. 27 and 29).

Figure 29:
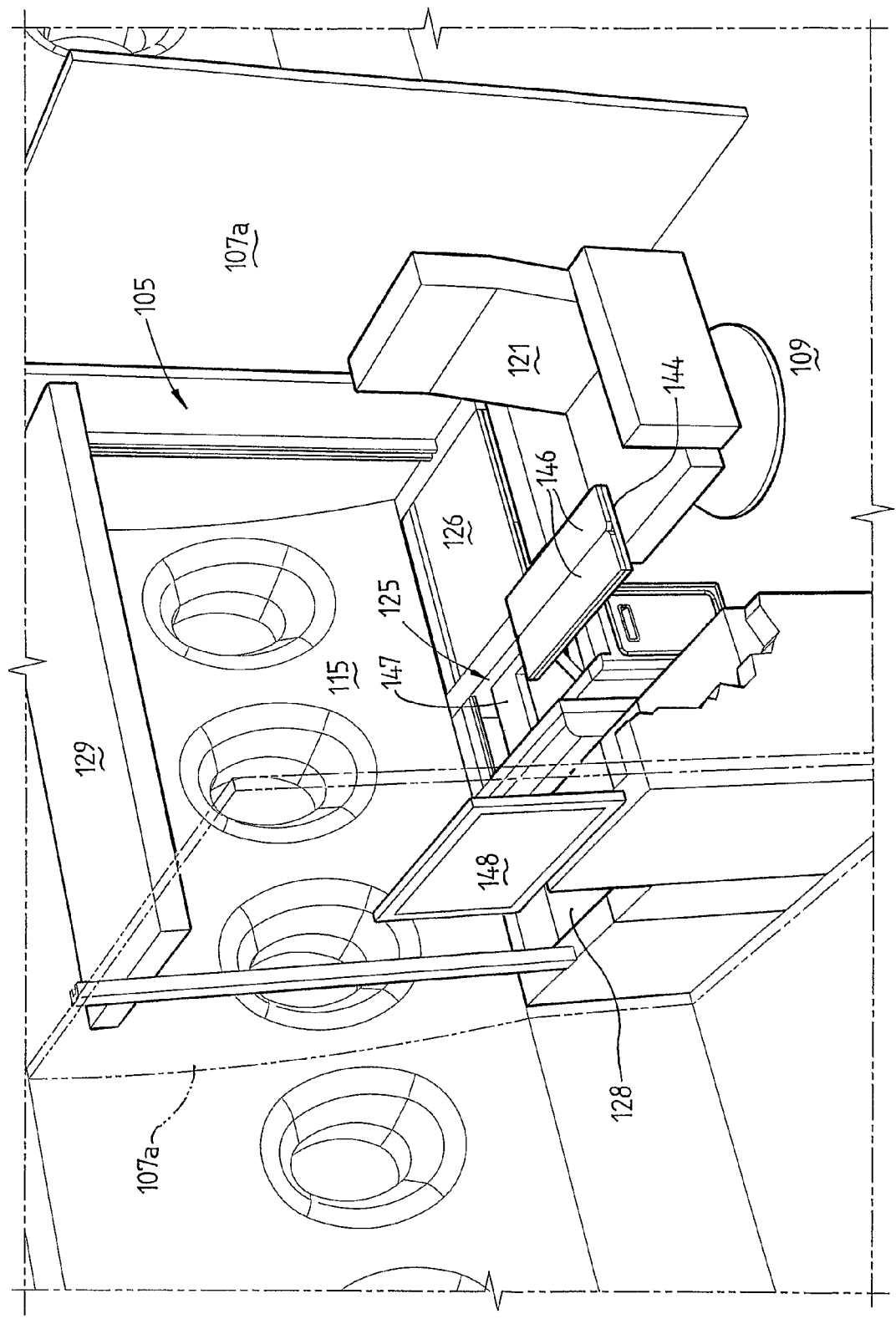

The support arm 37 is coupled to the base member 41 so that it can not pivot forward beyond the operative position shown in FIGS. 27 and 29.

The support arm 37 comprises a V-shaped channel member 45 near the upper end thereof which acts as a support element for the table 33 and supports an underside of the table 33 when the table assembly is in the operative position with the table 33 in the horizontal position.

The above-described table assembly 25 can be moved from the storage position to the operative position by sliding the base member 41 outwardly from the storage position, lifting the table 33 upwardly and inwardly into the compartment space and thereby pivoting the support arm 37 upwardly and inwardly into the compartment space until the table 33 is in the horizontal operative position.

As is indicated above, the compartment is multi-functional and the basic furniture can be positioned in a range of configurations. This feature is illustrated, by way of example, in FIGS. 28 to 39.

Figure 28:
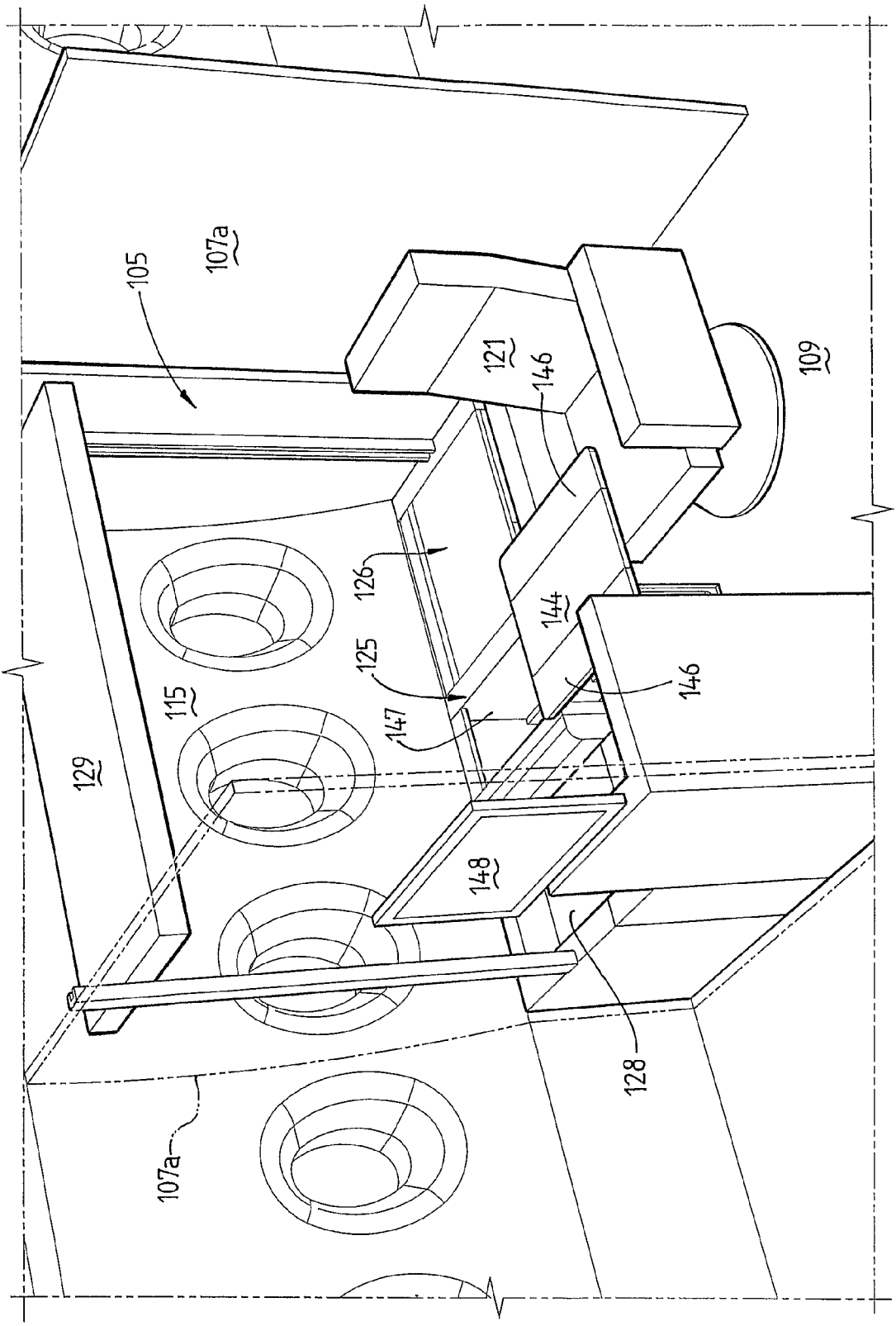
FIGS. 28 to 39 are a series of perspective views of the private compartment shown in FIGS. 23 to 26 that illustrate a sequence of operations to transform the private passenger compartment into different configurations.

FIG. 28 illustrates one configuration of the private passenger compartment 5. In this configuration the table assembly 25 is in the operative position in which the table 33 of the table assembly 25 is in an unfolded position in a space between the chair 21 and the seat 27. In this configuration the compartment is multi-functional and can be used for a range of purposes. For example, the table assembly 25 can be used as a meals table for supporting one or more meals delivered to the compartment to be eaten by the single passenger occupant of the compartment or the passenger and a "visiting" passenger.

Alternatively, the table assembly 25 can be used as a work desk by the single passenger or the passenger and a "visiting" passenger.

FIG. 29 illustrates a first step to transform the compartment from the configuration shown in FIG. 28 to an alternative configuration.

In the first step shown in FIG. 29 the wings 35 of the table 33 are folded inwardly onto the central panel of the table 33.

Figure 30:
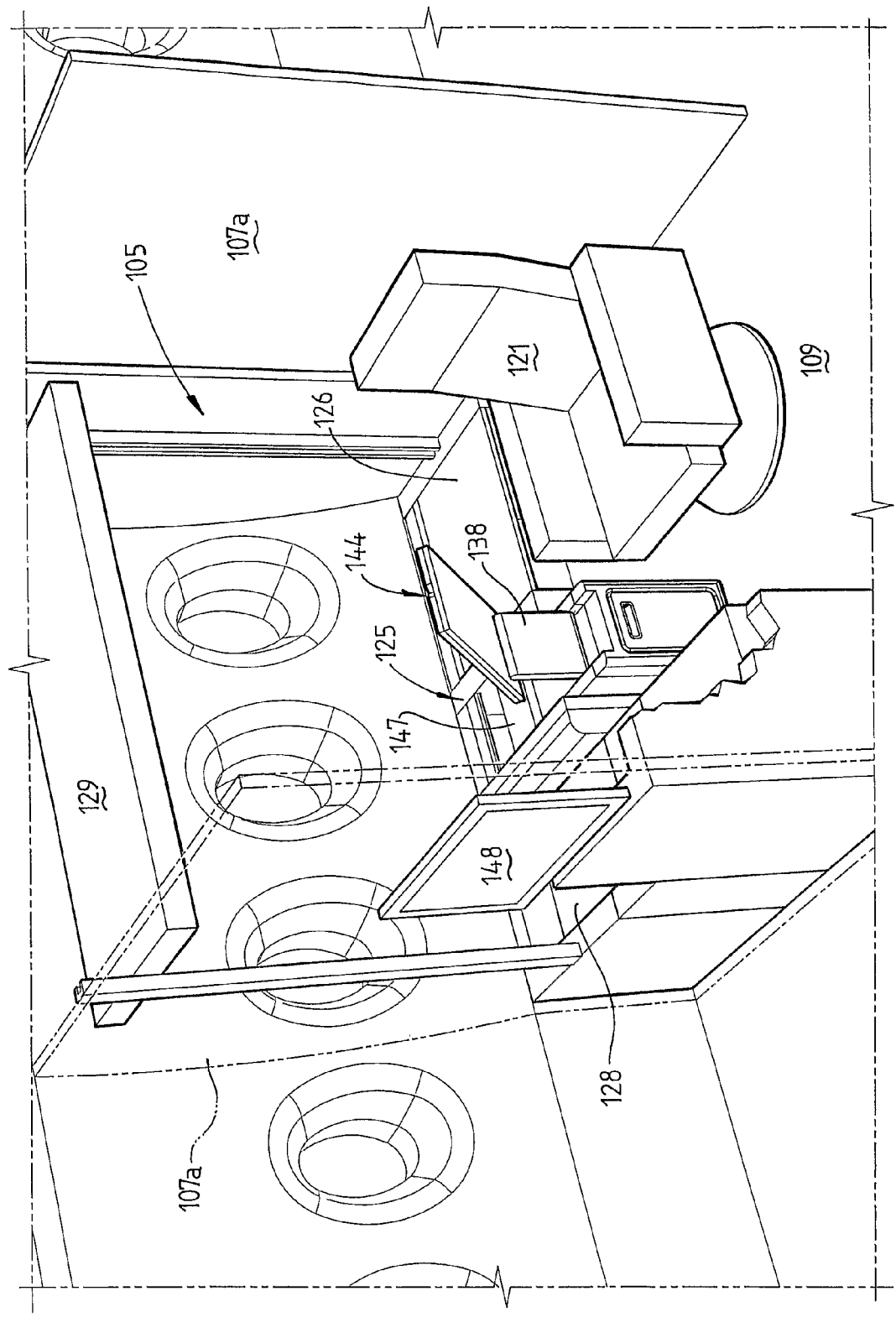
Figure 31:
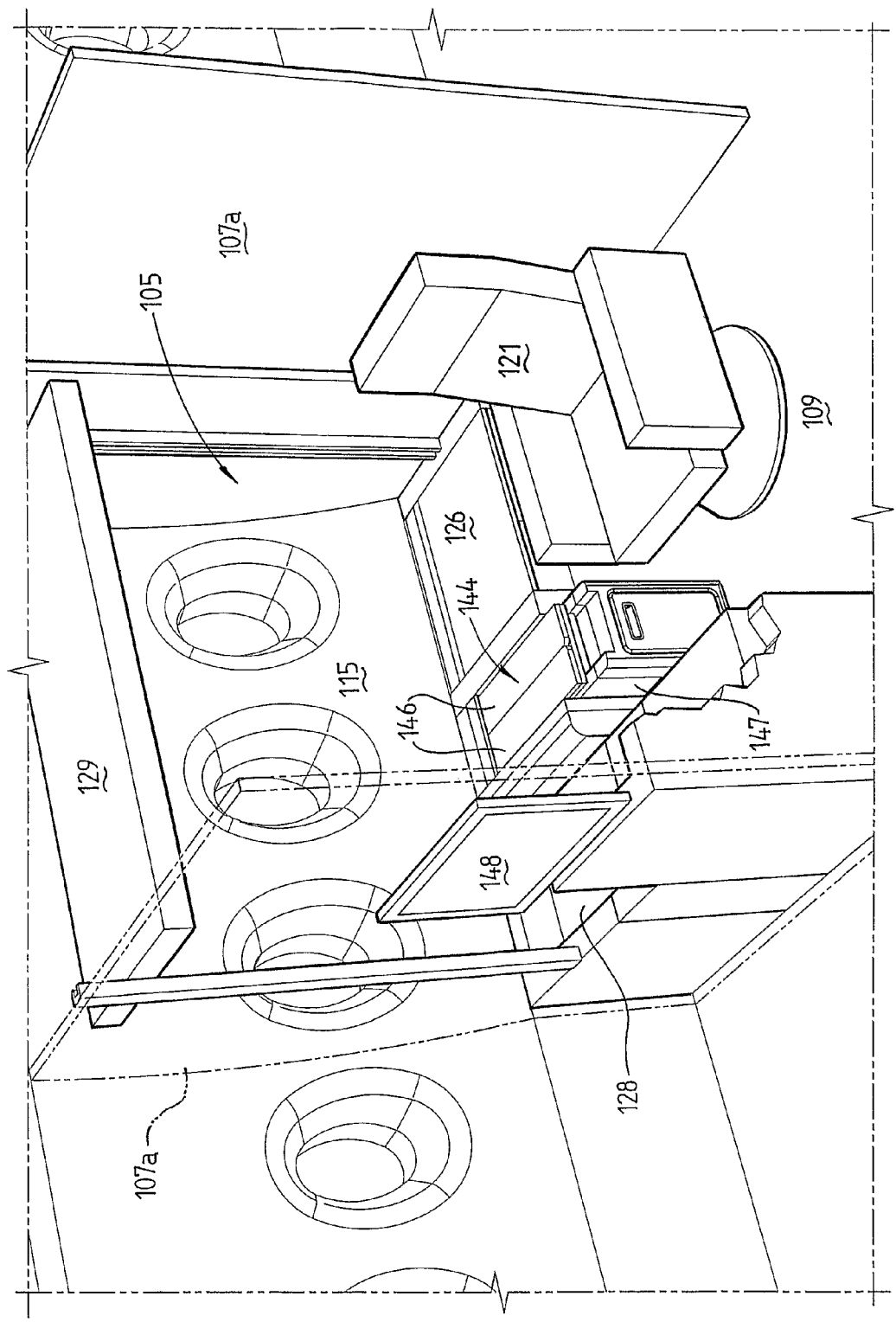

With reference to FIGS. 30 and 31, in a second step the table 33 is lifted upwardly and outwardly (in relation to the interior of the compartment space) toward the aircraft side wall 15 to pivot the table 33 and the support arm 37 into the folded position shown in FIG. 12 in which the table 33 and the support arm 37 overlie and are supported by the base member 41.

Figure 32:
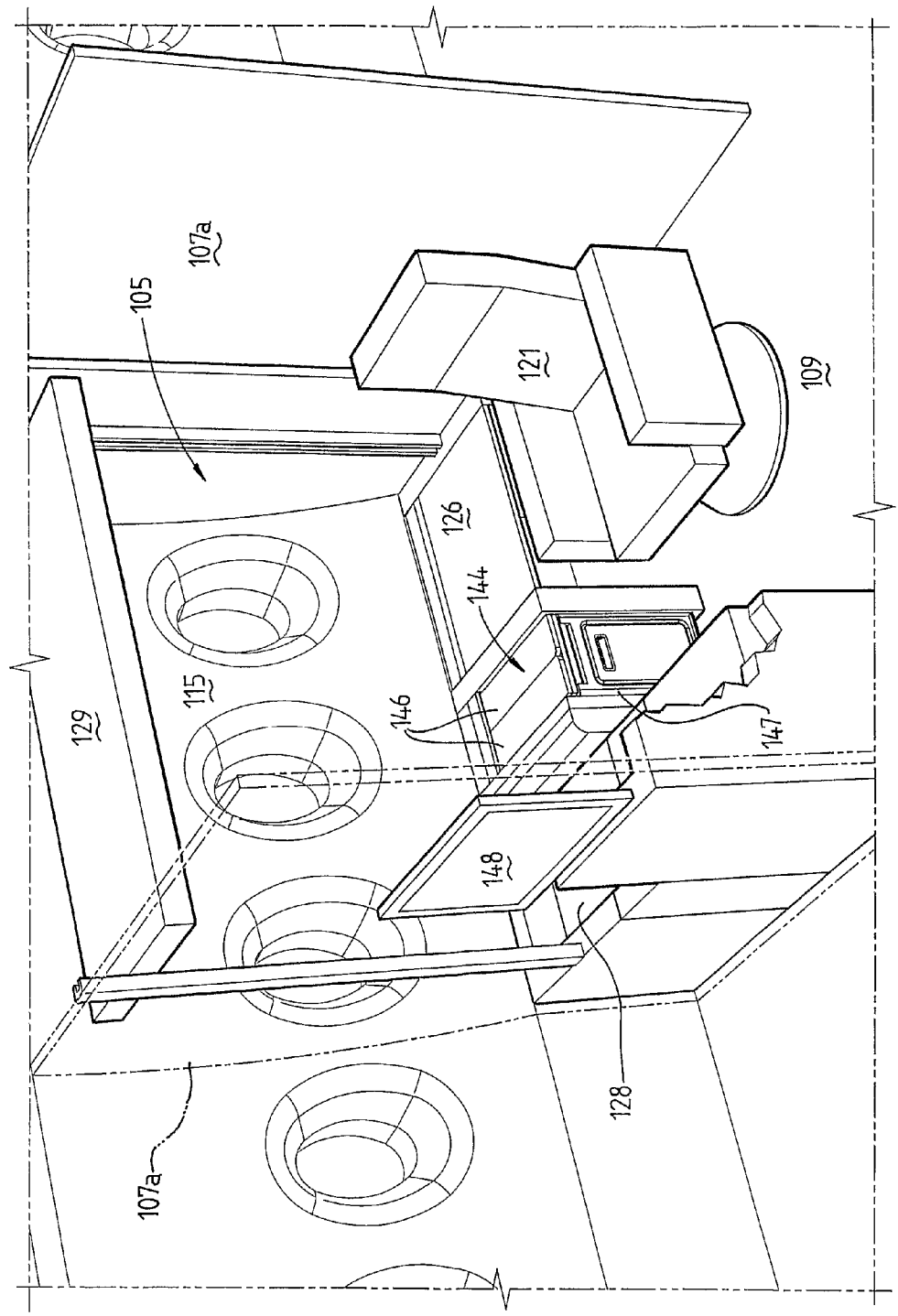

Thereafter, the base member 41 of the table assembly 25 is slid from the operative position shown in FIG. 31, in which the base member extends into the space between the chair 23 and the seat 27, and the storage position shown in FIG. 32, in which the base member 41 is located against the aircraft side wall 15.

The final step in the transformation sequence involves sliding a cover member 61 over the stored table assembly 25 to provide a flat working surface.

Figure 33:
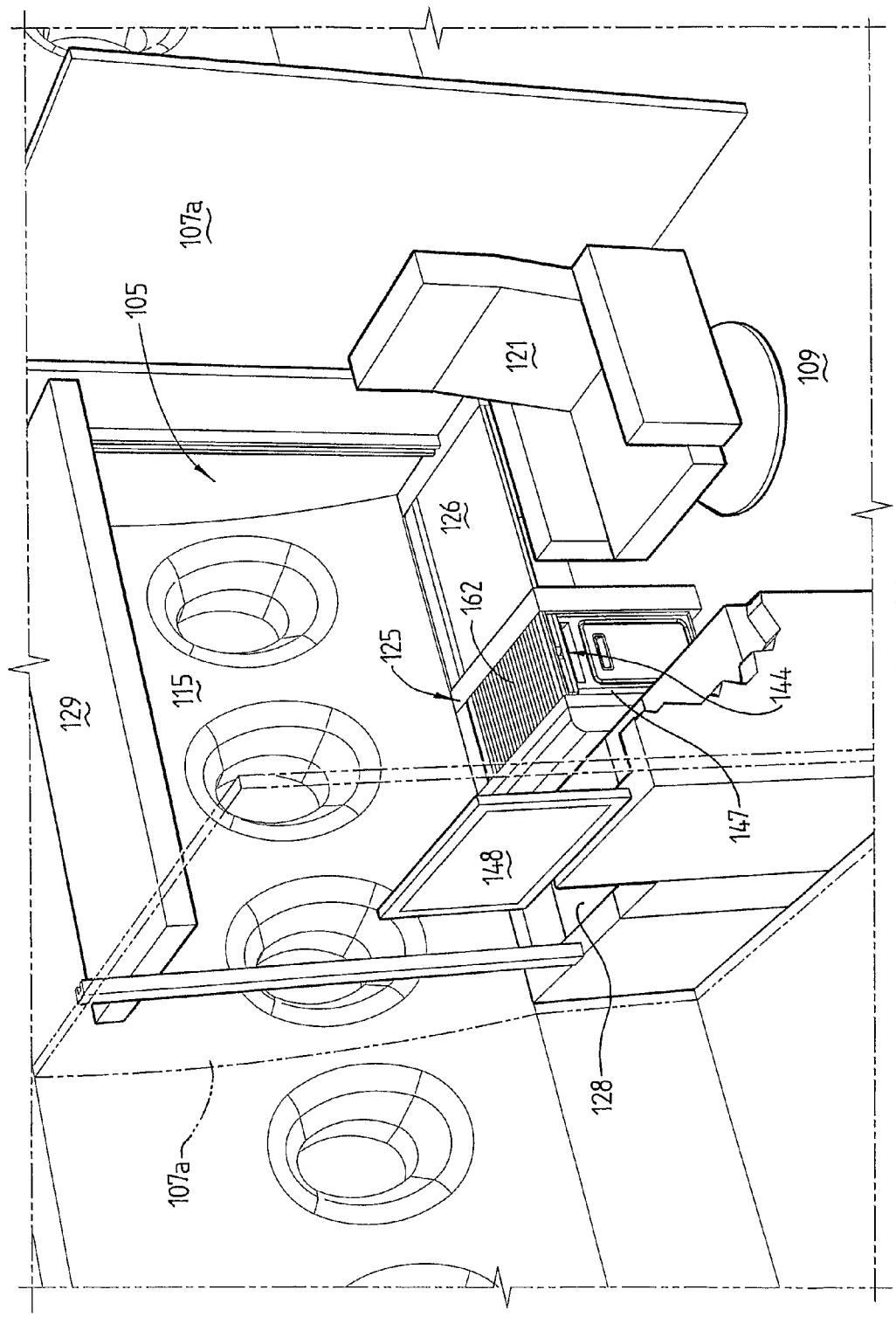

In the configuration shown in FIG. 33 the compartment is multi-functional. By way of example, the single passenger occupant may be seated in the chair 23 or on the seat 27 and relax or work, as required. When seated on the chair 23 the passenger may conveniently view the visual display screen 45.

Figure 34:
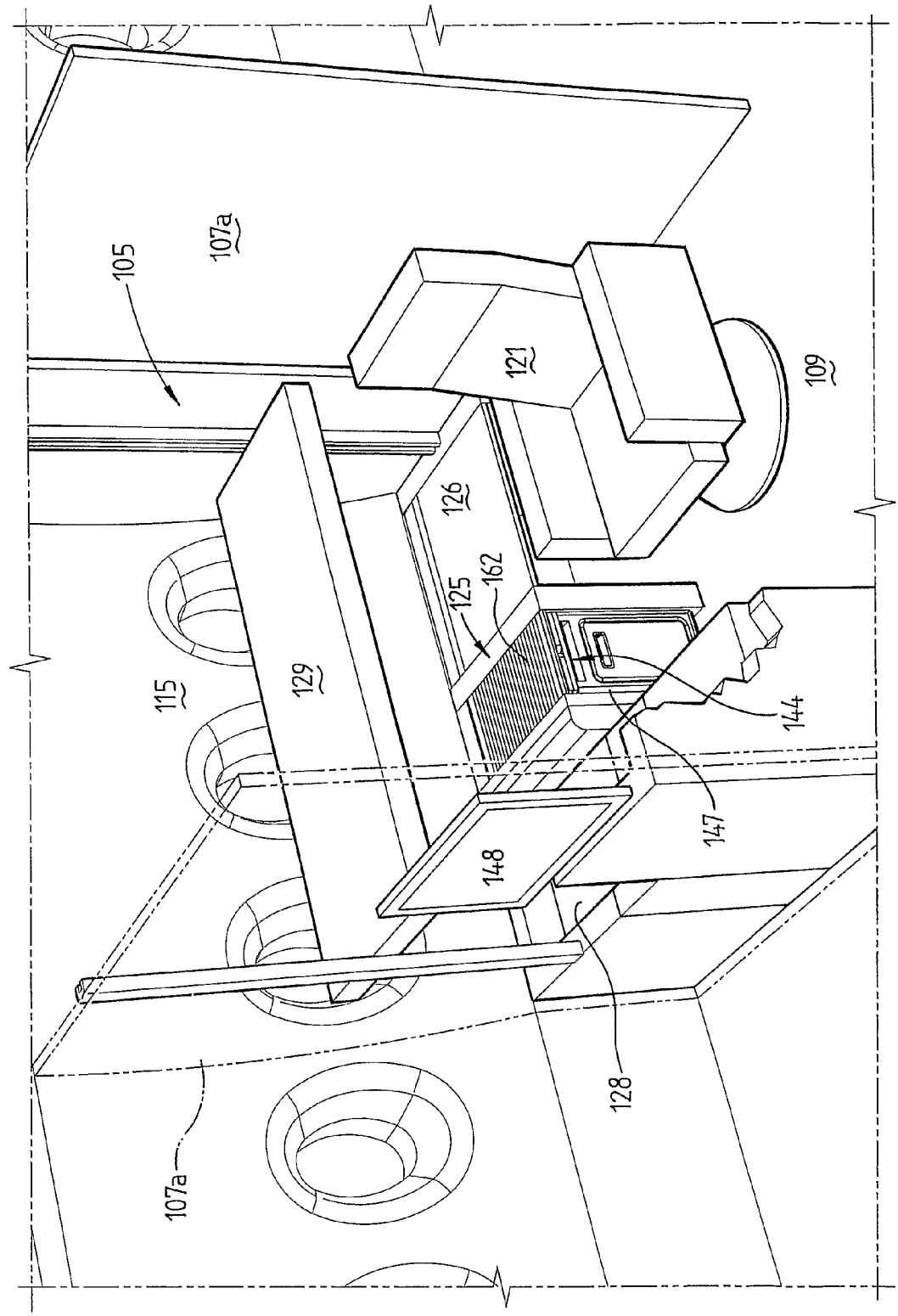

FIG. 34 illustrates an intermediate position of the bed 29 in a first step to transform the configuration shown in FIG. 33 to a "sleeping" configuration.

Figure 35:
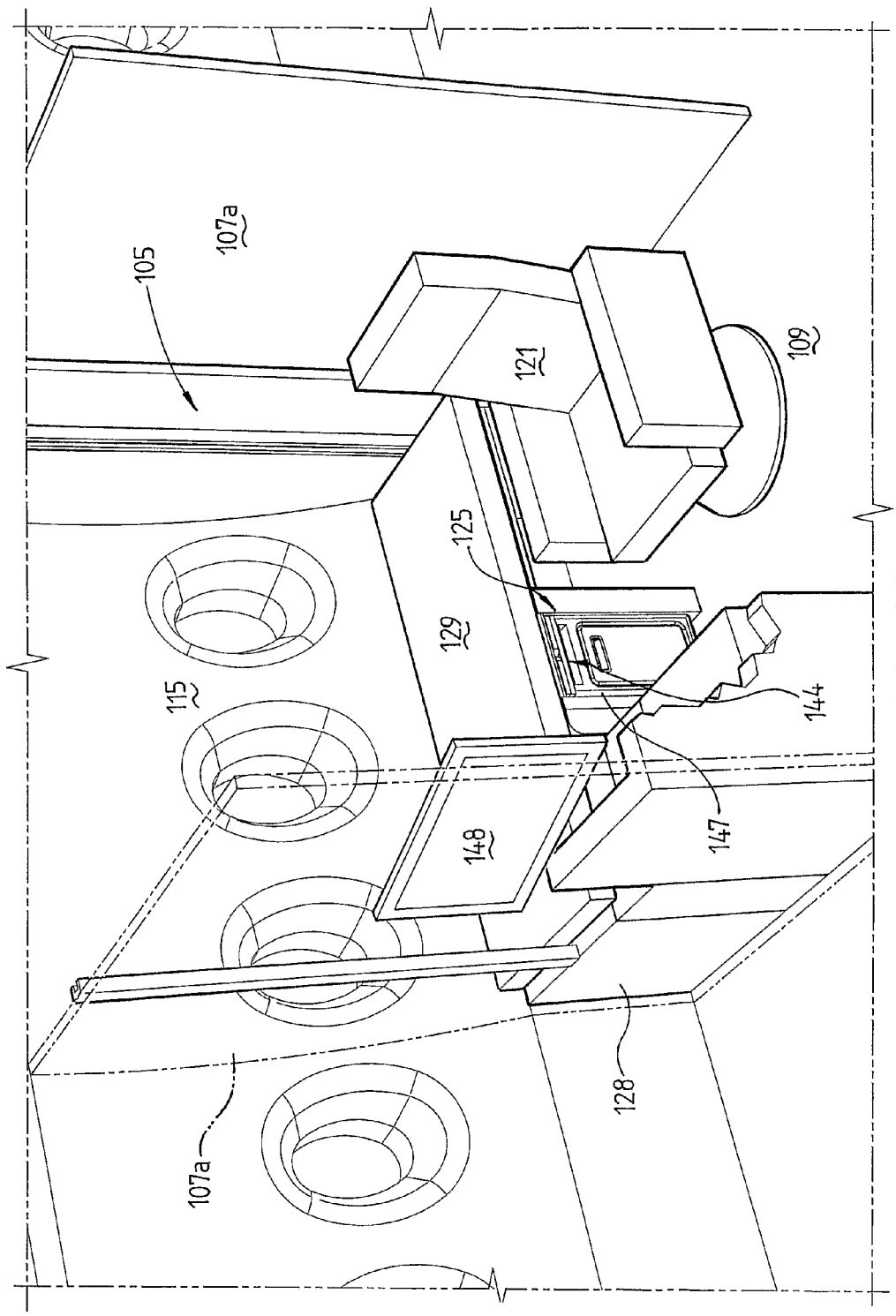

This step comprises lowering the bed 29 from the raised position shown in FIG. 14 to the lowered position shown in FIG. 35.

FIG. 35 illustrates the bed 29 supported by the work desk 23 in the lowered position of the bed.

Figure 36:
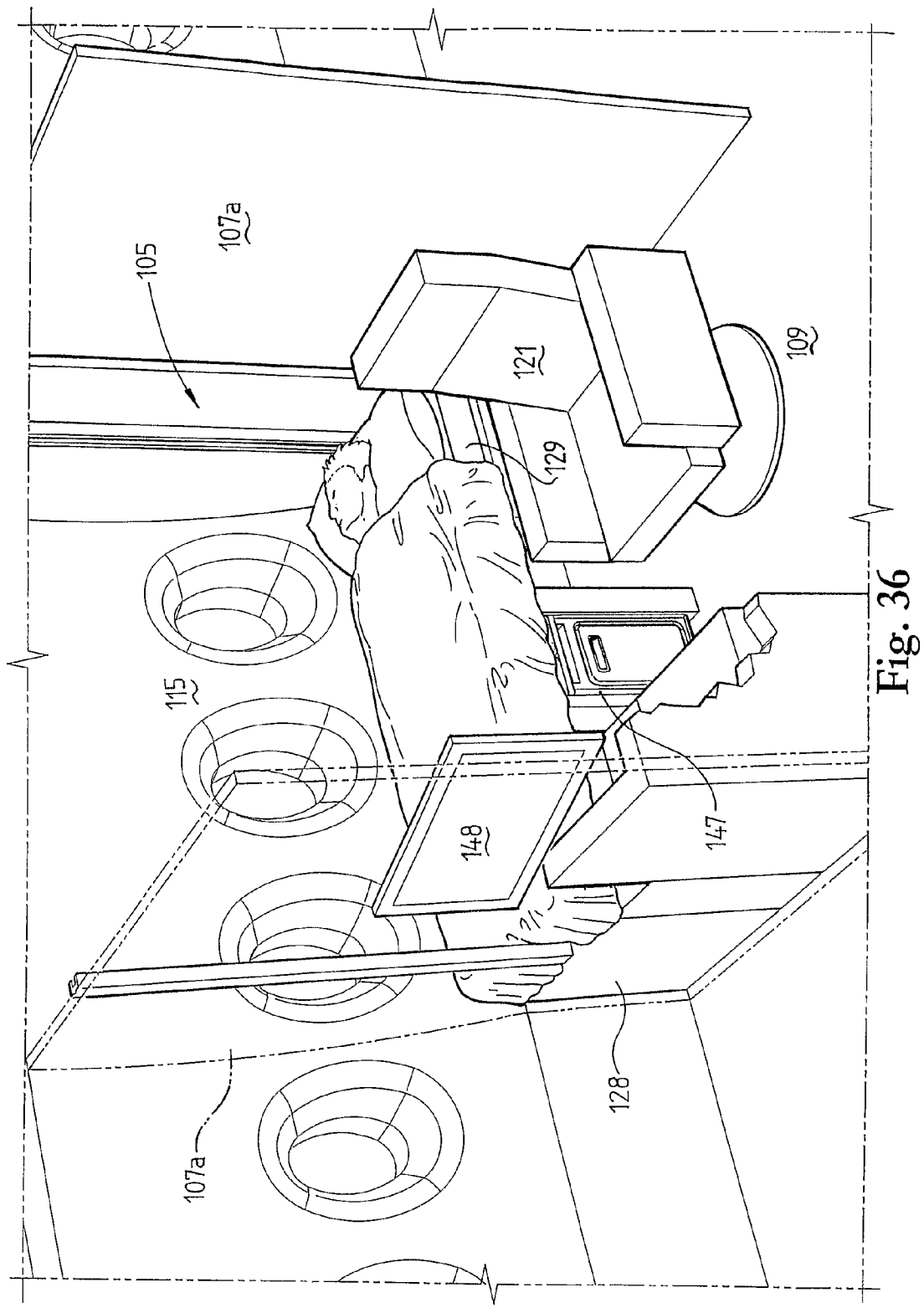

FIG. 36 illustrates the compartment in the sleeping configuration with a person on the bed 29 and the visual display screen 45 pivoted to a position in which the person on the bed can view the screen while in a reclining position.

Figure 37:
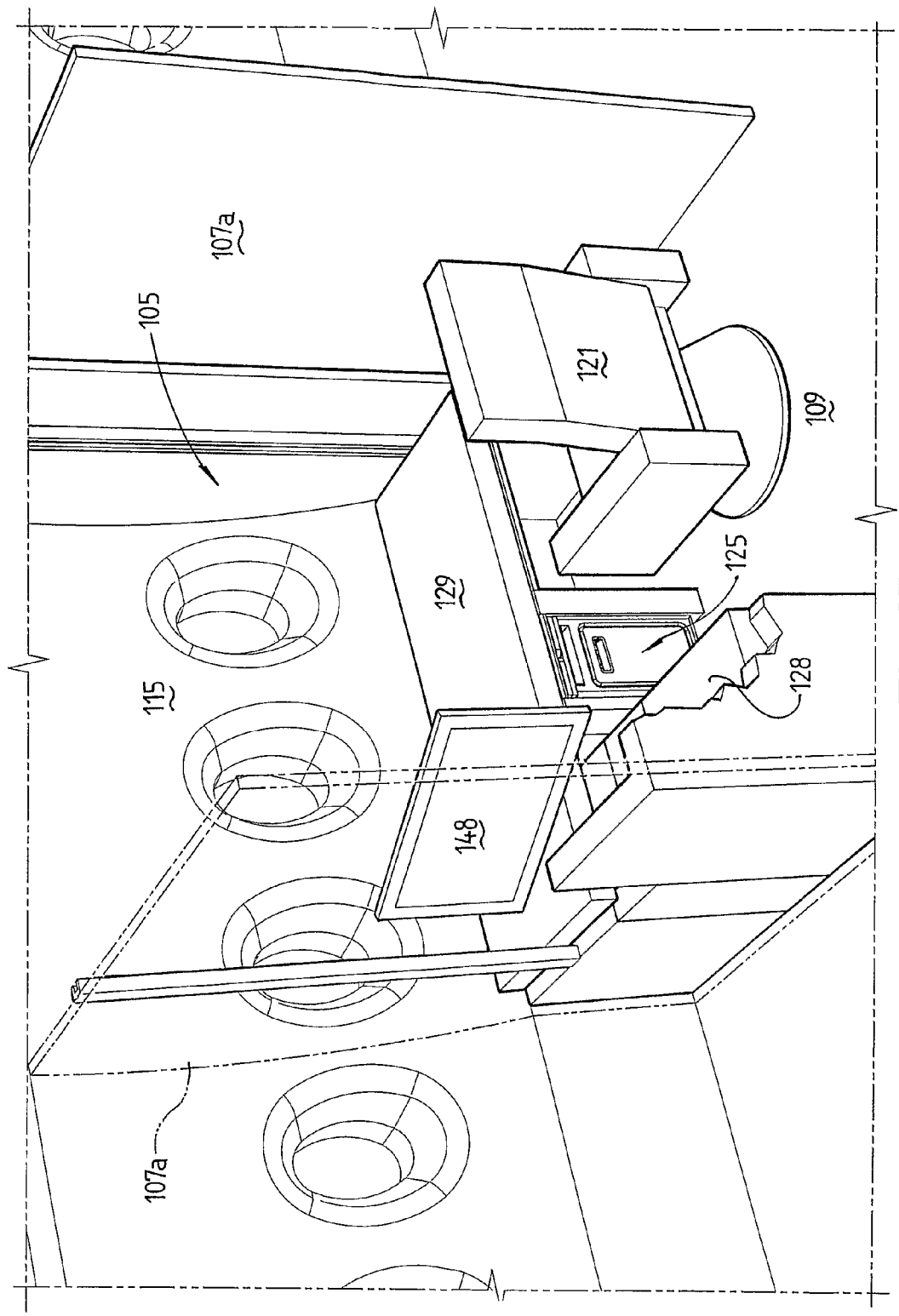

FIG. 37 illustrates a first step to transform the compartment from the "sleeping" configuration shown in FIG. 17 to a "working" configuration.

The first step involves swiveling the chair 23 from the forward position shown in FIG. 36 to a working position shown in FIG. 37 in which a person seated in the chair is facing towards the aircraft side wall 15.

Figure 38:
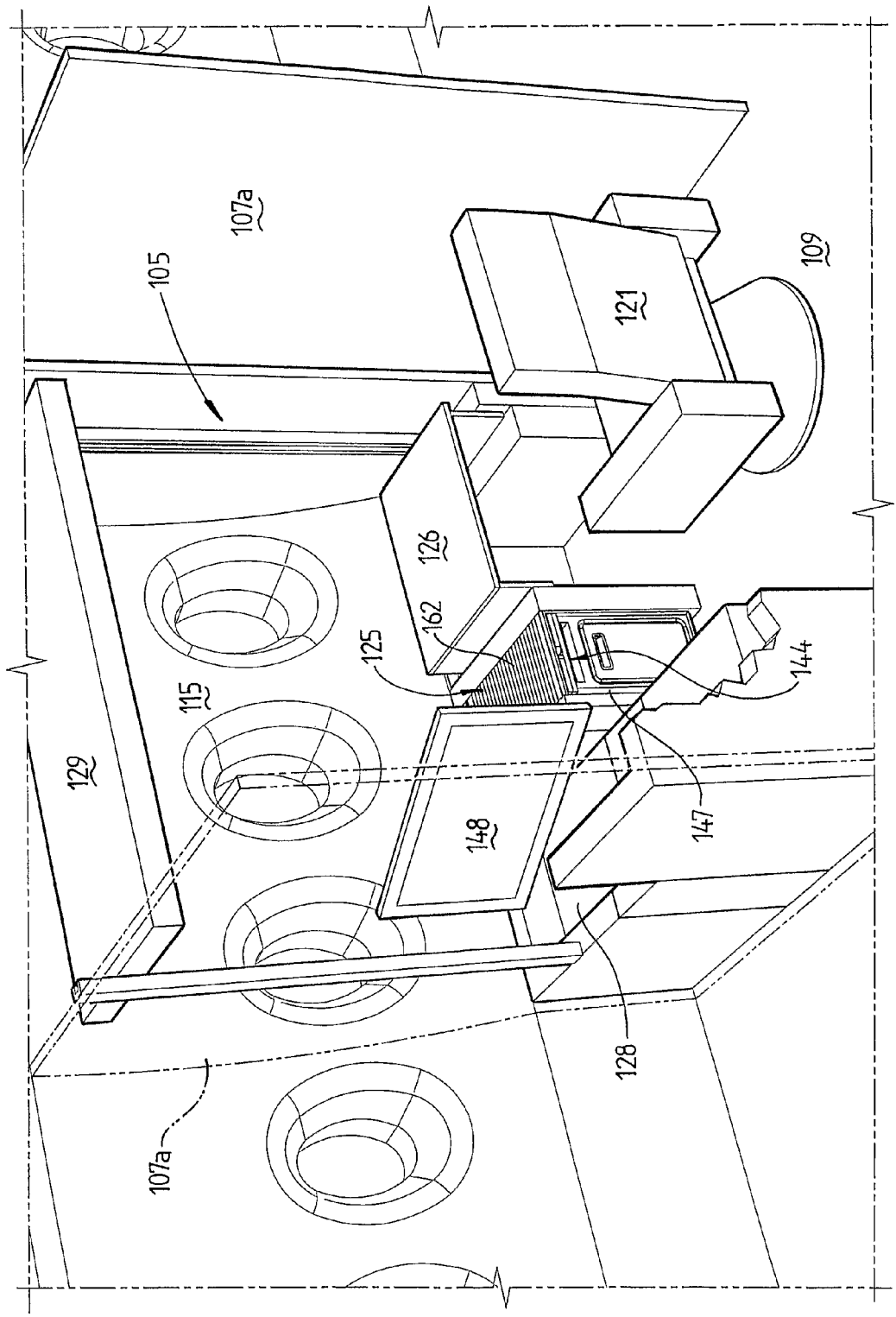

FIG. 38 illustrates a subsequent step of raising the bed 29 from the lowered position to the raised position shown in the figure. This step enables access to the work desk 23.

The work desk 23 is vertically adjustable so that a person seated in the chair 23 can adjust the height as required to suit personal preferences.

Figure 39:
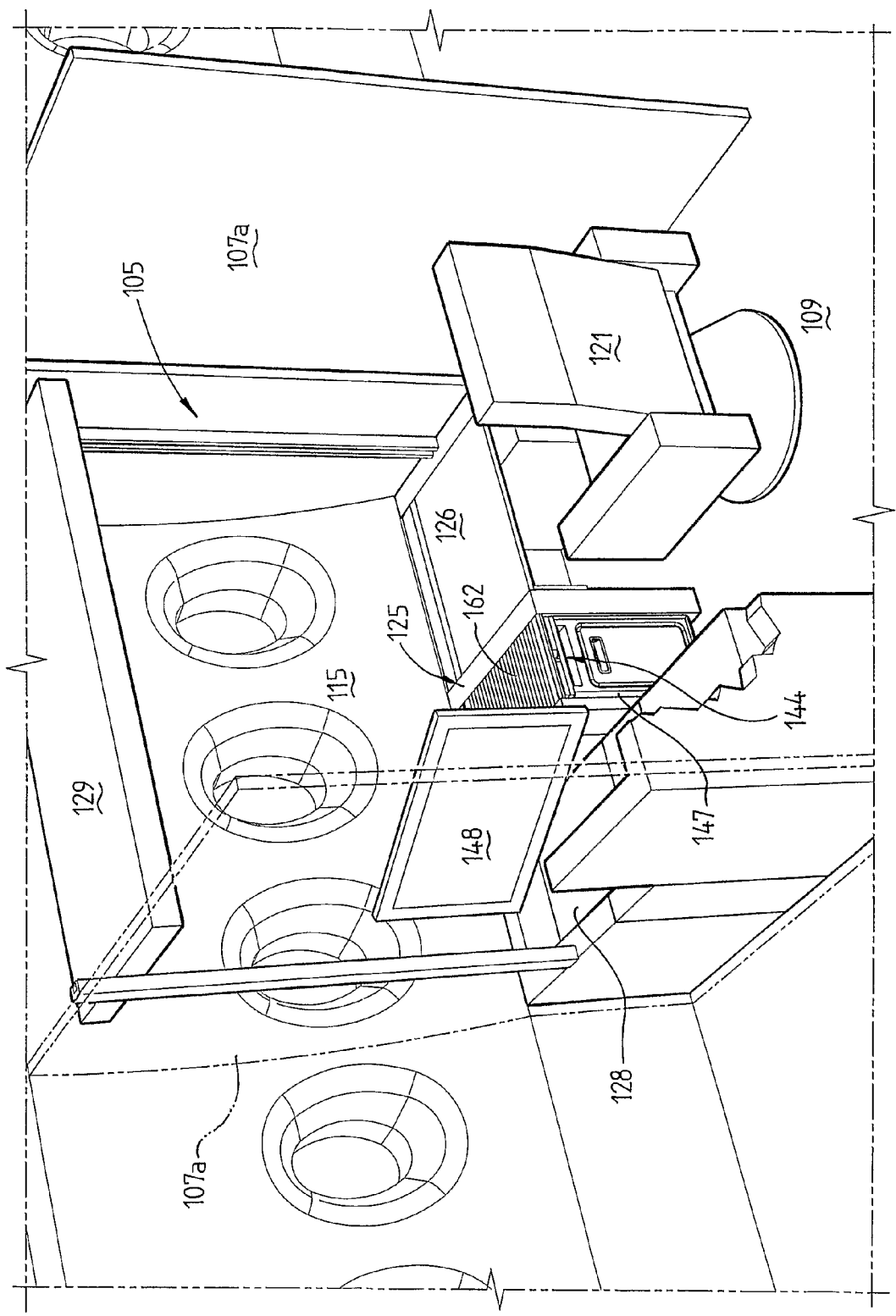

FIG. 38 illustrates the work desk in one raised position and FIG. 39 illustrates the work desk in a lowered position.

Many modifications may be made to the embodiments of the cabin and the private passenger compartment described above with departing from the spirit and scope of the invention.

By way of example, whilst the embodiments of the cabin comprise 3 rows 11a, 11b, 11c of private passenger compartments separated by aisles 51, the invention is not so limited and extends to any suitable arrangement of the compartments 5.

The invention claimed is:

1. A private passenger compartment for a passenger during an aircraft flight comprising:
    a plurality of compartment walls that are at least 1.5 m high and define a compartment space, one of said compartment walls having a bed storage space, and said compartment walls including two opposed side walls and two opposed end walls that interconnect the side walls and define the compartment space,
    a doorway in one of the side walls that enables access to the compartment from an aisle, with the doorway being positioned centrally in the side wall and dividing the side wall into two sections with one section on each side of the doorway,
    one passenger chair only that is disposed in the compartment space and suitable for take off and landing of the aircraft and is foldable between a first seating position and a second support position,
    a bed that is foldable between a horizontal sleep position in the compartment space and a vertical storage position in a bed storage space,
    at least one of (a) a credenza that may house a table assembly and (b) a seat located in the compartment space and adjacent a wall that is opposite said wall having the bed storage space,
    wherein said chair, said bed and said at least one of said credenza and said seat are structurally interactive such that they can be selectively arranged in a number of different configurations adapted for relaxation, work, and sleep,
    wherein when the chair is in the first seating position, a person can sit upright in the chair in at least one of the relaxation and work configurations;
    wherein when the chair is in the second support position, a back portion of the chair can be folded forward over a seat portion of the chair to define a support for the bed when the bed is in the sleep position in the sleep configuration, with the bed being supported on the back portion and wherein the back portion and the seat portion are below the bed and do not form an extension of the bed; and
    wherein, at least one of the seat and the credenza defines a support for the bed when the bed is in the sleep position in the sleep configuration.

2. The compartment defined in claim 1 wherein the compartment walls are at least 1.6 m high.

3. The compartment defined in claim 1, wherein the sections of the doorway wall are curved, for example by being convex as viewed from the aisle, so that the compartment is wider in these sections of the compartment than in the region of the doorway.

4. The compartment defined in claim 3 wherein the doorway wall includes at least one window.

5. The compartment defined in claim 4 wherein the doorway wall includes at least two windows, with at least one window in each section of the doorway wall.

6. The compartment defined in claim 5 wherein the windows include retractable blinds that can be closed.

7. The compartment defined in claim 1 includes a door assembly for closing the doorway.

8. The compartment defined in claim 7 wherein the door assembly comprises a door mounted for sliding movement from a retracted position within the doorway wall to a closed position in which the door extends across the doorway and closes the compartment.

9. The compartment defined in claim 7 wherein the door assembly comprises an upper rail and a curtain supported by the rail.

10. The compartment defined in claim 9 wherein the rail is mounted for sliding movement between a retracted position within the doorway wall and an operative, ie closed, position in which the rail extends across the doorway.

11. The compartment defined in claim 10 wherein the curtain is adapted to fold in a concertina fashion so that (a) the curtain folds against the doorway wall when the rail is slid into the retracted position and (b) the curtain expands and closes the doorway when the rail is in the operative position.

12. The compartment defined in claim 1 includes a door assembly for closing the doorway and wherein the door assembly comprises a pair of doors mounted for sliding movement inwardly towards each other from retracted positions within the sections of the doorway wall that are on opposite sides of the doorway.

13. The compartment defined in claim 12 wherein the doors include transparent windows that are positioned so that the view through windows in the sections of the doorway wall is not obscured by the doors when the doors are in the retracted positions.

14. The compartment defined in claim 13 wherein the doors include retractable blinds that can be closed when the doors are in the closed positions.

15. The compartment defined in claim 1 wherein the chair defines a bedside table when the chair is in the second support position.

16. The compartment defined in claim 1 wherein the seat is adapted to define a support for the bed when the bed is in the sleep position.

17. The compartment defined in claim 1 wherein the credenza is adapted to define a support for the bed when the bed is in the sleep position.

18. The compartment defined in claim 17 wherein the credenza is movable from a raised operative position in which the credenza can be accessed conveniently by a passenger seated in the chair to a lowered bed support position.

19. The compartment defined in claim 1 wherein the table assembly is housed in the credenza so that it can be moved from a stored position within the credenza to an operative position with a table of the table assembly extending horizontally into the compartment proximate the chair.

20. The compartment defined in claim 1 wherein an interactive combination of the furniture in the compartment space comprises: (a) the chair to one side of the doorway, (b) the seat to the other side of the doorway, (c) the credenza against the wall opposite the doorway, and (d) the table assembly housed in the credenza and movable between a stored position within the credenza and an operative position with a table of the table assembly extending horizontally into a space between the chair and the seat.

21. A private passenger compartment for a passenger during an aircraft flight comprising:
    a plurality of compartment walls that define a compartment space, one of the compartment walls comprising a bed storage space and another of the compartment walls comprising a doorway that enables access to the compartment, the doorway being positioned centrally in the another of the compartment walls;
    a passenger chair that is disposed in the compartment space and is foldable between a first seating position and a second support position;
    a table assembly, at least a portion of which is disposed between the passenger chair and one of the compartment walls, for use by a passenger when the passenger chair is in the first seating position;
    a seat disposed within the compartment space and across the compartment space from the passenger chair; and
    a bed that is foldable between a horizontal sleep position in the compartment space and a vertical storage position in the bed storage space,
    wherein
    when the chair is in the first seating position, a person can sit upright in the passenger chair, and
    when the passenger chair is in the second support position, a back portion of the passenger chair is folded forward over a seat portion of the passenger chair to define a support for the bed when the bed is in the horizontal sleep position, and the bed folds out of the bed storage space and is supported by the support, the table assembly, and the seat when in the bed is in the horizontal sleep position.

22. The private passenger compartment as claimed in claim 21, wherein the passenger chair further comprises two arm rests.

* * * * *